United States Patent [19]

Levine et al.

[11] Patent Number: 4,876,740

[45] Date of Patent: Oct. 24, 1989

[54] RADIOTELEPHONE SYSTEM EMPLOYING DIGITIZED SPEECH/DATA SIGNALLING

[75] Inventors: Stephen N. Levine; Albert J. Leitich, both of Chicago, Ill.

[73] Assignee: Motorola, Inc., Schaumburg, Ill.

[21] Appl. No.: 310,013

[22] Filed: Feb. 13, 1989

Related U.S. Application Data

[60] Continuation of Ser. No. 905,369, Sep. 8, 1986, abandoned, which is a division of Ser. No. 771,460, Aug. 30, 1985, abandoned.

[51] Int. Cl.$^4$ ............................................... H04Q 7/04
[52] U.S. Cl. ..................................... 455/33; 375/114; 379/59; 379/63; 455/51
[58] Field of Search .................. 379/58, 59, 60, 63; 455/31, 33, 38, 51; 375/94, 95, 104, 111, 114, 116; 340/825.06, 825.14, 825.62; 370/18, 21, 106, 110.1; 371/6, 47; 341/107

[56] References Cited

U.S. PATENT DOCUMENTS

| | | | |
|---|---|---|---|
| 3,380,023 | 4/1968 | Magnuski | 375/57 |
| 3,684,967 | 8/1972 | Kelly | 375/95 |
| 3,836,956 | 9/1974 | Cross | 371/47 |
| 4,001,693 | 1/1977 | Stackhouse et al. | 375/116 |
| 4,038,540 | 7/1977 | Roberts | 375/95 |
| 4,352,955 | 10/1982 | Kai et al. | 379/59 |
| 4,353,130 | 10/1982 | Carasso et al. | 375/118 |
| 4,404,675 | 9/1983 | Karchevski | 371/47 |
| 4,443,883 | 4/1984 | Berger | 375/116 |
| 4,506,372 | 3/1985 | Massey et al. | 375/116 |
| 4,575,582 | 3/1986 | Makino | 455/38 |
| 4,599,490 | 7/1986 | Cornell et al. | 379/60 |
| 4,658,416 | 4/1987 | Tanaka | 379/60 |

OTHER PUBLICATIONS

Barker, "Group Synchronizing of Binary Digital Systems", Characteristics of Transmission Channels, pp. 273-274 and 279-284.

Taub et al., Principles of Communications Systems, 1986 & 1971, pp. 28-31.

Primary Examiner—Benedict V. Safourek
Attorney, Agent, or Firm—Raymond A. Jenski; Rolland R. Hackbart

[57] ABSTRACT

A cellular radiotelephone system is disclosed in which the signalling protocol for the system is embedded in the frame synchronization of the digital messages transmitted on the system. Multiple functions are accomplished by the synchronization signal and include call supervision, mode definition, and data frame synchronization. The synchronization signal is a high auto correlation, low cross correlation sequence of a predetermined number of data bits. Different bit sequences may be employed as a synchronization signal while conveying call supervision information defining the serving fixed site. Additionally, the logical inverse of the synchronizing signal may be utilized interchangably with the synchronizing signal to define the fixed site. A repetitive pattern of synchronizing signals and logical inverse synchronizing signals convey system mode information without increasing signalling overhead or losing the correlation performance of the full synchronization word.

19 Claims, 19 Drawing Sheets

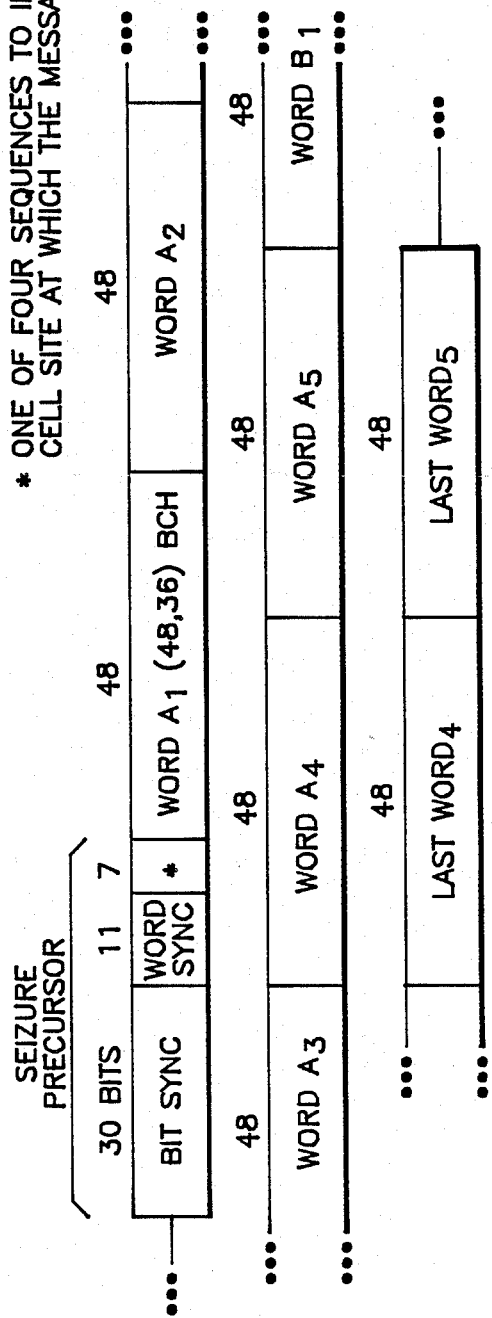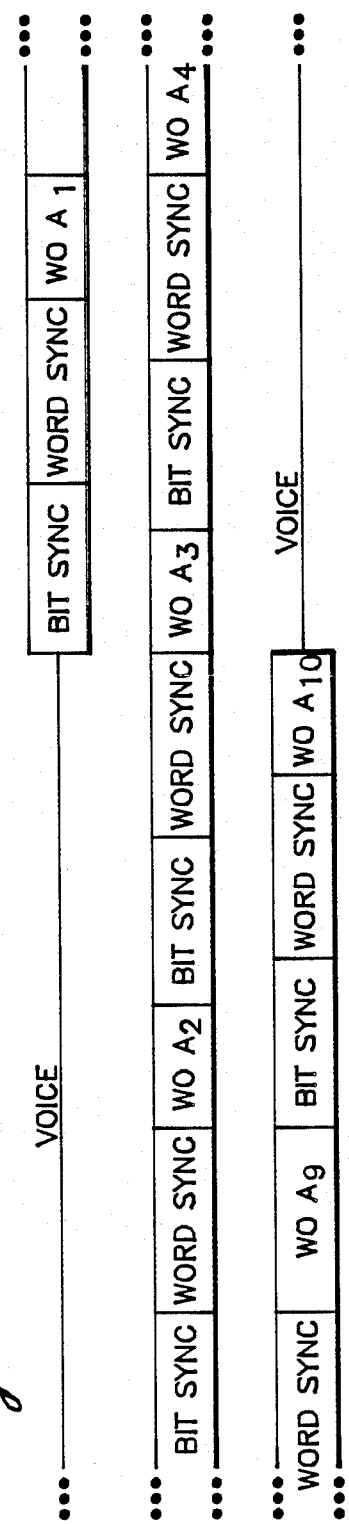
Fig. 3 PRIOR ART
Fig. 4 PRIOR ART

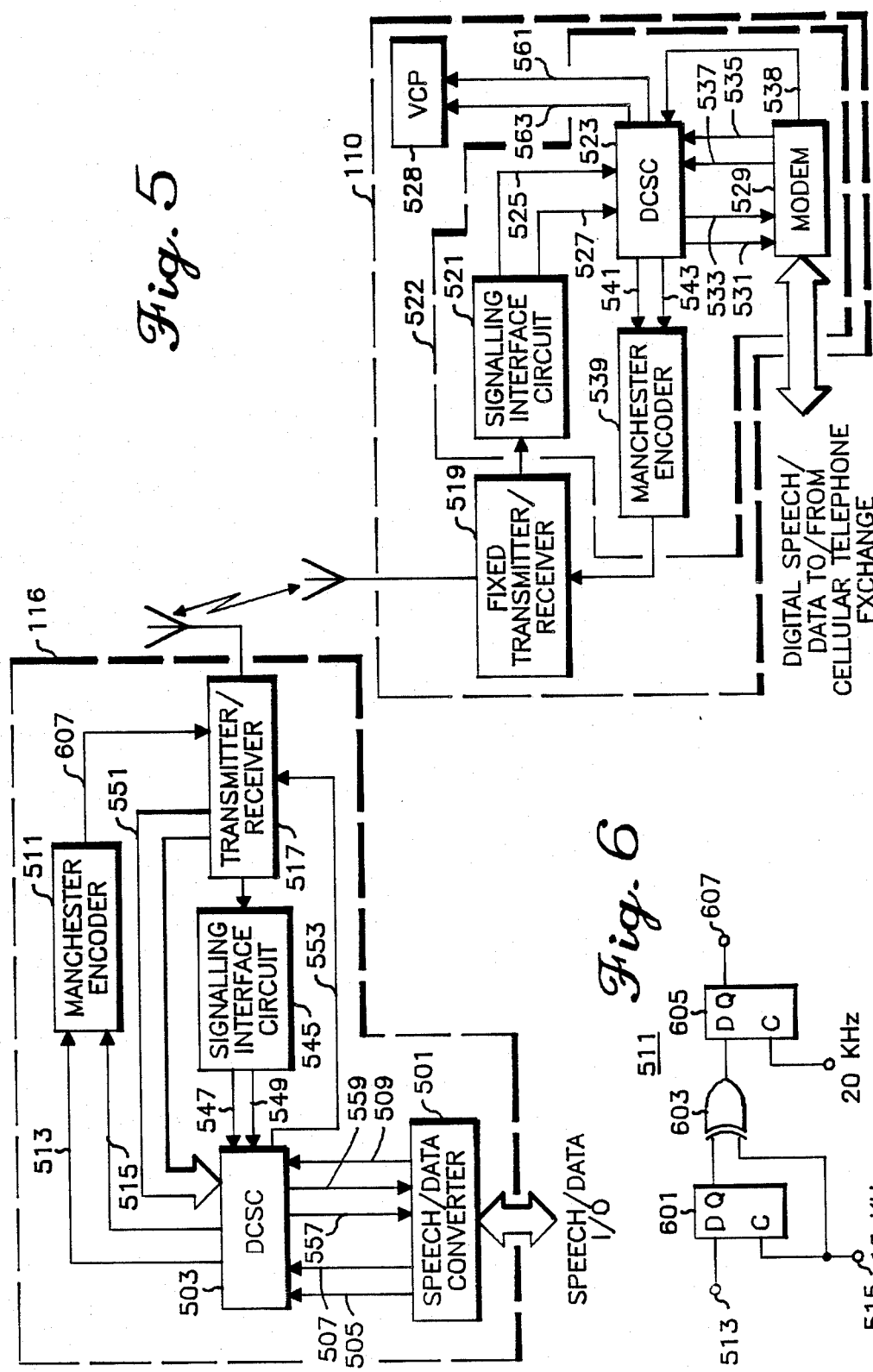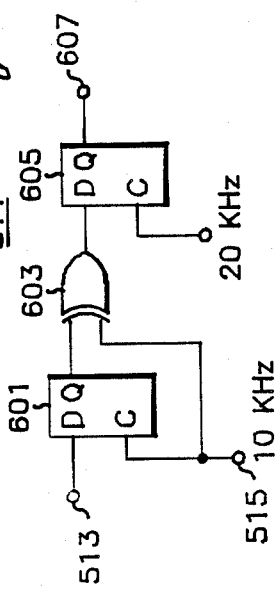

RADIOTELEPHONE SYSTEM EMPLOYING DIGITIZED SPEECH/DATA SIGNALLING

This is a continuation of Ser. No. 905,369 filed Sept. 8, 1986, now abandoned, which was a division of Ser. No. 771,460 filed Aug. 30, 1985, now abandoned.

BACKGROUND OF THE INVENTION

This invention relates generally to data signalling protocol and more specifically to a high speed data and digital speech signalling protocol for radio transmission, particularly between mobile and fixed stations of a cellular radiotelephone system. Reference is made to copening application, Ser. No. 771,458 (now U.S. Pat. No. 4,649,543, filed on the same date as the present application and containing related subject matter.

Mobile radiotelephone service has been in use for some time and tranditionally has been characterized by a central site transmitting with high power to a limited number of mobile units in a large geographic area. Mobile transmissions, due to their lower power, are received by a network of receivers located remote from the central site and returned to the central site. Due to the limited number of radio channels available, a maximum number of conversations for an entire city would equal the few channels available. Consequently, mobile telephone users discovered that radiotelephone was different than landline telephone due to the often busy conditions of the channels.

To resolve this difficulty, cellular systems were developed to reuse radio channels in a given geographic area. A cellular system characteristically has the coverage area divided into contiguous smaller coverage areas (cells) using low power transmitters and receivers at the central site. One cellular system is further described in U.S. Pat. No. 3,906,166 assigned to the assignee of the present invention. The limited coverage area enables the channel frequencies used in one cell to be reused in another cell geographically separated according to a predetermined plan. One such plan is disclosed in U.S. Pat. No. 4,128,740, assigned to the assignee of the present invention. Thus, a large number of channels can be made available in a metropolitan area and the service can appear to be identical to a standard telephone.

The cell system typically utilizes one channel in each cell to receive requests for service (on a "reverse set-up" frequency) from mobile subscriber units, to call mobile subscriber units (on a "forward set-up frequency") and to instruct mobile subscriber units to tune to a frequency pair where a conversation may take place (a "voice" channel). The one "set-up" channel in each cell is continuously assigned the task of receiving and transmitting data and is the channel to which the subscriber unit tunes when not in a conversational state.

Since the cells may be of relatively small size, the likelihood of a mobile or portable subscriber unit traveling out of one cell and into another is high. To maintain communications, the subscriber unit is "handed-off" between one cell and another. The cellular systems in use track the unit and decide when a handoff is necessary to maintain quality communications. The subscriber unit is commanded, via a high speed data message interrupting the audio communications on the voice channel, to retune the transceiver to another frequency which is available in a new cell. This handoff requires a relatively short period of time and the user is generally unaware of the occurrence.

The data messages are transmitted in a Manchester encoded format, a format which is well known by those skilled in the art, at a speed of 10 kilobits per second in the United States. (Other countries such as the United Kingdom, have different data speeds such as 8 kilobits per second). This digital transmission system has been thoroughly studied for application to high capacity mobile telephone systems and the error rates, spectrum occupancy, immunity to radio channel fading, and other performance characteristics have been extensively reported.

Since cellular telephone systems provide performance characteristic of the land line telephone system and interconnect with it, subscribers expect land telephone system features from the cellular telephone system. One such feature is the transmission of data from one location to another. Many telephone subscribers connect data communications devices, such as a personal computer, to the telephone system via a modem. Modems are familiar to those skilled in the art and fundamentally operate by converting data "1" and "0" levels to distinct tones or to particular tone waveform phase relationships which can be transmitted by the land telephone network.

It would be natural to connect a computing device via a modem to a radiotelephone subscriber unit for communication with another data generating device via the land telephone network. In fact, this has been done and produced unsatisfactory results. Rapid multipath fading, commonly experienced in high frequency cellular radiotelephone communications, causes gaps and significant phase changes in modem-generated tones such that data carried by the radio channel becomes garbled or missing. Furthermore, a handoff between cells, which to a human engaged in conversation is virtually unnoticeable, becomes a formidable obstacle for the communication of data generated by a data generating device.

This limitation has been resolved by converting the input data to a data format compatible with radio channel transmission and reconverting the radio channel data format back to the original format upon reception. The data transmission is halted prior to a handoff and is resumed after the handoff is completed. A detailed description of the above process may be found in U.S. Pat. No. 4,654,867, Labedz, et al. and assigned to the assignee of the present invention.

A second feature of the landline telephone system which subscribers to a cellular radiotelephone system wish to have is that of relative security of their conversations. Digital scrambling techniques for secure radio communication channels has been disclosed in U.S. Pat. Nos. 4,167,700; 4,434,323; and 4,440,976 each assigned to the assignee of the present invention. These inventions, however, do not address the aforementioned handoff requirement of cellular systems and do not provide the necessary transponding of a supervisory signal to maintain communications on an assigned channel.

Cellular systems, to reduce interference between cochannel users, employs several distinguishable signals (SAT signals) to identify cellular fixed sites. Each site is assigned one signal which is transmitted with each transmission from fixed site to subscriber unit. The subscriber unit, in turn, transponds the same signal to the fixed site and the radio channel connection is maintained. If anomalous propagation enables cochannel transmission to or from one cell to be received in another cell, the lack of a proper transponded signal will cause the radio channel to be deallocated from the interfering subscriber unit. These distinguishable SAT signals typically are unique tone frequencies for analog transmissions and unique bit sequences for digital transmissions.

The present invention serves the requirements of cellular radiotelephone subscribers by providing at least three modes of operation which are automatically selected and verified by the system via the signalling information transmitted between fixed site and subscriber unit. A common data former is employed for both data transmission and digital voice privacy and continuous bit synchronization may be maintained from subscriber unit through the fixed site to the landline instrument.

SUMMARY OF THE INVENTION

Accordingly, it is an object of the present invention to enable clear analog transmissions, digital privacy speech transmissions, and data transmissions to occur between fixed site and subscriber units in a cellular radiotelephone system.

It is a further object of the present invention to provide digital supervisory tone (SAT), signalling functions, and system control messages compatible with a cellular system while transmitting digital information.

It is a further object of the present invention to employ a common data format for both digital privacy and data transmissions.

It is a further object of the present invention to provide continuous bit synchronization from subscriber unit through the cellular fixed site to the landline privacy or data terminal.

These and other objects are achieved in the present invention which, stated briefly, is a cellular radiotelephone system employing a unique digital message format on a radio channel to convey high speed digital messages and system modes between fixed sites and subscriber units. A plurality of message data frames having a predetermined number of bits contain the digital message and are preceeded by a preamble of a predetermined number of bits or by the logical inverse of the preamble. The preamble or its logical inverse consist of a selected one of a plurality of possible data words and are employed in a predetermined pattern of preambles and logical inverses to define a selected system mode.

BRIEF DESCRIPTION OF THE DRAWINGS

FIG. 3 is a timing diagram of the signalling format used on the reverse set-up channel of a conventional cellular system.

FIG. 4 is a timing diagram of the signalling format used on the forward voice channel of a conventional cellular system.

FIG. 5 is a block diagram of the subscriber unit and the fixed site equipment which may be used to realize the present invention.

FIG. 6 is a schematic diagram of a Manchester data encoder which may be utilized in the present invention.

DETAILED DESCRIPTION OF THE PREFERRED EMBODIMENT

Figure 1:
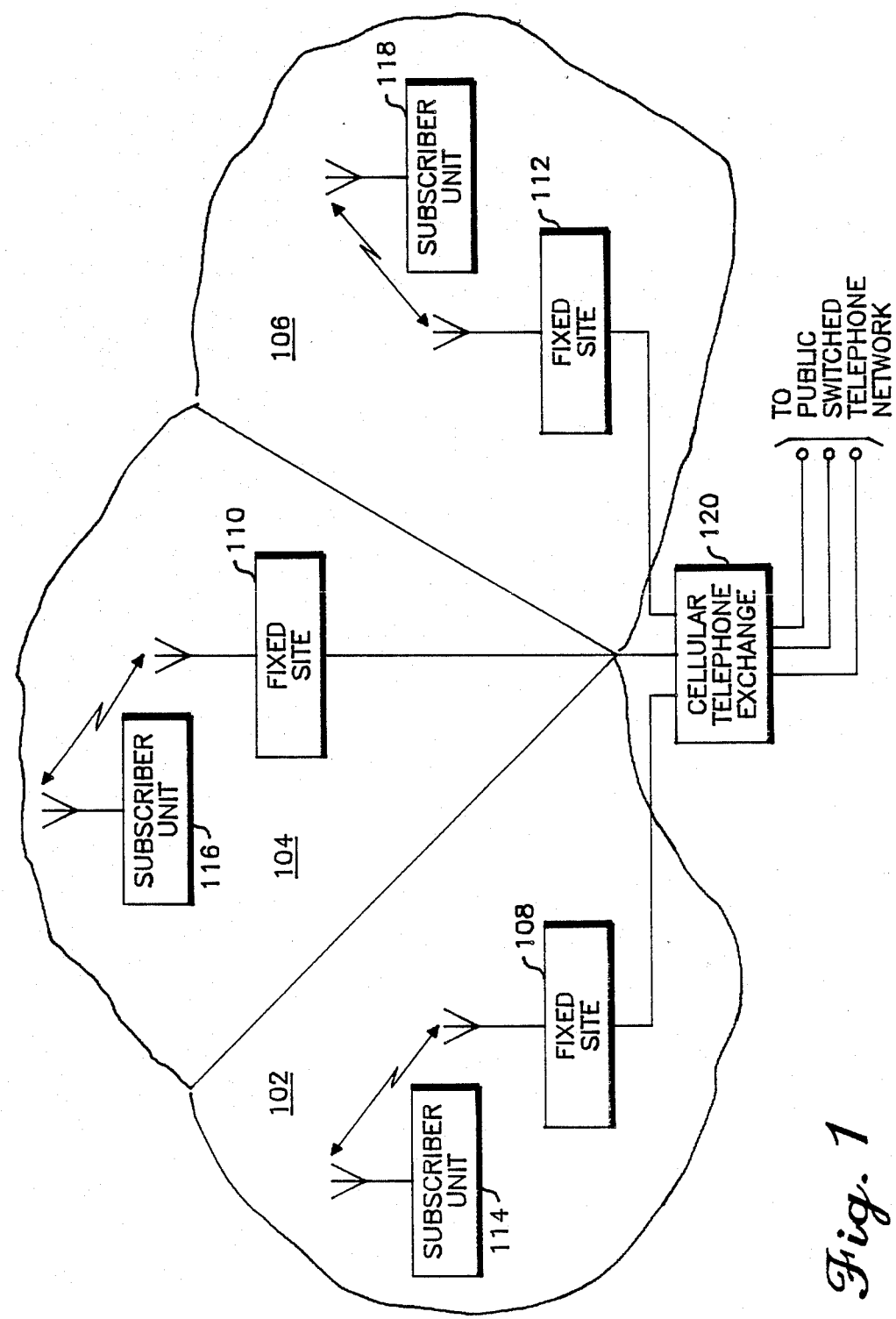
FIG. 1 shows a block representation of a conventional three cell cellular system.

A representation of a multisite radio system such as that which may be employed by a cellular radiotelephone system is shown in FIG. 1. In this representation, a geographic area is shown divided into three of a possible many radio coverage areas (102, 104, and 106) which are commonly called cells. Generally located within each cell is a configuration of fixed site equipment shown as fixed site equipment 108, 110, and 112. The fixed site equipment typically consists of receivers, transmitters, and a site controller. In one implementation of a cellular system, the fixed transmitters and receivers are located at the center of each cell and illuminate this cell with radio signals omni-directionally or directionally. Other cellular implementations place the fixed site at the periphery or elsewhere within the cell. Further discussion of a center illuminated sectorized cellular system may be found in U.S. Pat. No. 4,128,740 assigned to the assignee of the present invention.

A plurality of subscriber units are typically present in each cell and are represented in FIG. 1 by subscriber units 114, 116 and 118. Any particular subscriber unit may be vehicle mounted or may be hand carried. Each subscriber unit in a cellular radiotelephone system has the capability of initiating and maintaining a telephone call via one of the transmitters and one of the receivers of the fixed site equipment and a cellular telephone exchange 120. The cellular telephone exchange 120 performs call routing and public switch telephone network interface and may be a device such as an EMX 500 marketed by Motorola, Inc. The cellular telephone exchange 120 may accept a call from either the public switch telephone network or a subscriber unit and route that call to its proper destination.

In a conventional cellular system, one duplex radio channel is assigned the task of transmitting information such as call requests, voice channel assignments, handoff instructions as a served subscriber unit travels out of the radio coverage area of one cell and into the radio coverage area of another cell, and system maintenance instructions. On the inward or reverse set up channel half of the duplex channel, the fixed site controller receives requests for service and other functions from the subscriber unit. Actual message transmission occurs on another duplex channel, commonly known as a voice channel, available within a radio coverage cell.

Thus, a telephone call may come in from the switched telephone network to the cellular telephone exchange 120, be routed through fixed site equipment 110 which determines if a voice channel is available in cell 104 and instructs subscriber unit 116 to tune to the unoccupied voice channel via the forward set up channel. The subscriber unit 116 tunes to the designated voice channel and message conversation may begin.

To provide a check of the continuing operation of the subscriber unit during a call, a tone, equivalent to the DC supervision in normal telephone operation, is transmitted continuously from the fixed site controller via the fixed transmitter, received by the subscriber unit and retransmitted by the subscriber to the fixed site receiver. This tone is known as supervisory audio tone (SAT), and is used to control cochannel interference. In conventional cellular systems, small offsets in the frequency of the SAT are used to identify each cell and if the subscriber unit having service does not transpond the proper SAT, the call will be terminated.

Figure 2:
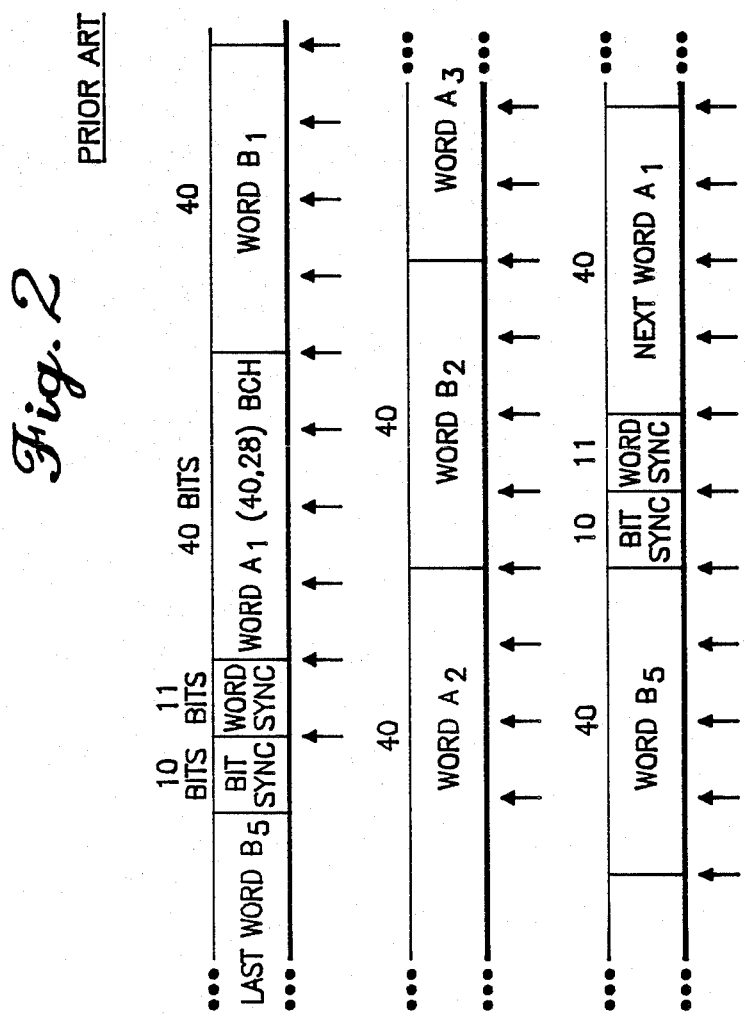
FIG. 2 is a timing diagram of the signalling format used in the forward set-up channel of a conventional cellular system.

In a cellular system having relatively large numbers of subscriber units, a large amount of information must be transmitted and received on the set-up channel. Efficient design suggests that the data be organized into a synchronous format of fixed length words and synchronizing pulses. The conventional format for signalling on a cellular system forword set-up channel is shown in FIG. 2 and the format for the cellular system reverse set-up channel is shown in FIG. 3. Since data reliability on the radio transmission path may be relatively low, error control techniques are utilized to improve the reliability. One source of poor reliability is error introduced in the radio channel by Rayleigh fades caused by subscriber unit motion through the multi-path interference patterns generated by reflection from obstacles near the receiving equipment. These errors generally occur in dense bursts with the average burst duration related to the average fade length. Additionally, the bit error probability is substantially independent of data rate until bit lengths approach the average fade duration. This characteristic indicates that to minimize errors, data rates should either be very low or as high as channel bandwidth allows. Due to the amount of information to be transmitted and the availability of various error correction techniques, a 10 KBS data rate has been chosen for the standard data rate of the cellular system in the United States.

Referring to FIG. 2, the format convention used on the forward set-up channel is shown in a timing diagram. Data on this channel are transmitted continuously so that the subscriber units can synchronize to the format and interpret the data. The basic periodicity of the bit stream is 463 bits consisting of a 10 bit synchronization, and 11 bit word synchronization, and a two word interleaved pattern repeated 5 times. An additional bit, called the busy-idle bit, is inserted immediately following the bit synchronization, the word synchronization, and every 10 bits of each message word. If this bit is a logic level 1, the reverse set-up channel of the particular cell transmitting the message stream is idle and any subscriber unit desiring to initiate a call or to acknowledge a call may transmit on the reverse set-up channel. If the bit is a logic level 0, the reverse set-up channel is being used by another subscriber unit and the subscriber unit wishing to transmit on the reverse set-up channel must wait a short time interval until idle bits are observed.

On the reverse set-up channel, the subscriber units act in a random and competitive way to initiate calls. A different format shown in FIG. 3 is used in conventional cellular systems because all initiation signals and interferences appear and disappear in an uncorrelated fashion. A reverse set-up channel message is preceded by a 48 bit sieze precursor and consists of 1 to 5 words of 48 bits each which are repeated 5 times. The receiving fixed site controller performs a bit by bit 3 out of 5 majority vote to determine the 48 bit encoded word.

System control data messages may also be sent on the voice channels. These messages are primarily handoff messages directing a subscriber unit to tune to another channel but may also include other control functions such as subscriber unit transmitted power control. In a conventional cellular system the technique used is "blank and burst" in which the voice signal is muted and a data signal, shown in FIG. 4, is sent at a 10 kilobit rate. The format of the blank and burst message on the forward voice channel consists of 101 bits of "dotting" bit synchronization, 11 bits of word synchronization, and 40 bits of message data. This grouping of bit synchronization, word synchronization, and message is repeated, with reduced bit synchronization, ten times outbound from the fixed site equipment for a total of 11 consecutive repeats.

The standard landline telephone employs a DC current to indicate whether the telephone user is on hook or off hook. Most cellular radio telephone systems employ a tone analogous to the DC current for call supervision. By employing slightly different frequencies of analog tones, co-channel interference between neighboring cell radio coverage areas may be reduced. The tone is transmitted from the fixed site equipment on an active voice channel and is received and retransmitted by the subscriber unit using the channel. If another tone frequency is returned, the fixed site controller interprets the incoming signal as being corrupted by interference and the audio path is muted.

As users travel through the cellular system they may reach the coverage limit of one cell and therefore be better served by another cell. The process of switching the call from one cell to the other is known as handoff. When a need to handoff a subscriber unit from one cell to another occurs, a message is sent to the subscriber unit in the blank and burst format on the voice channel. The subscriber unit mutes the audio and tunes to a radio channel which was indicated in the blank and burst data message. The audio is unmuted when the subscriber unit has tuned to the new channel.

It has become increasingly desirable to provide cellular radio telephone systems with the capacity to carry more than analog voice messages. Purely data messages, such as those generated by data terminals or by digitized voice devices, has become increasingly common. One method of conveying purely data messages via a cellular radio telephone system was shown and described in U.S. Pat. No. 4,654,867, Labedz et al. and assigned to the assignee of the present invention. There, data messages were encoded into a format compatible with the prior art data formats. Additionally, methods for preventing data loss during handoff and for providing data signals equivalent to the supervisory tone were shown and described. The invention of the present application provides a means for transmitting high speed data and digitized voice over a cellular radio telephone system with minimized data errors and improved system control message transmission and reception.

The two basic components of the system of the present invention are shown in FIG. 5. A block diagram of a subscriber unit 116 is shown communicating with a fixed site 110. A signal to be transmitted by the subscriber unit 116 is input to speech/data converter 501 which performs an analog to digital conversion and may be implemented with an MC14402 Codec available from Motorola, Inc. A digital signal, representative of the input speech or data, is coupled to a digital cellular signalling control (DCSC) function 503 via a 9.6 KBS transmit data line 505 and a 9.6 KBS transmit clock line 507. Additionally, a 10 KBS clock line is coupled between the speech/data converter 501 and the DCSC 503 on line 509. The unique functions performed by the DCSC 503 will be described later. Binary data at a rate of 10 KBS is output from DCSC 503 to conventional Manchester encoder 511 via 10 KBS transmit data line 513 and 10 KHz clock line 515. A Manchester encoder 511 may be implemented with discrete logic functions as shown in FIG. 6. Ten KBS transmit data may be input on line 513 to a conventional DQ flip-flop 601 which is clocked by the 10 KHz clock input on line 515. The Q output of flip-flop 601 represents a clocked delay of the input and is input to exclusive OR 603 where it is exclusive OR-ed against the 10 KHz clock to produce an output which is a Manchester encoded data corrupted by transients. This output is coupled to DQ flip-flop 605 which is clocked by a 20 KHz clock signal conventionally derived and having edges coincident with the 10 KHz input signal to remove the undesirable transients. The Q output of flip-flop 605, on line 607, is a conventional Manchester encoded version of the input data.

Returning to FIG. 5, the output of Manchester encoder 511 is input to the transmitter of transmitter/receiver 517 which transmits the signal on a channel assigned by the cellular system. The transmitter/receiver 517 may be any mobile or portable transceiver compatible with a cellular system and is generally described in service manual 68P81066E40-0 available from Motorola, Inc.

The transmitted signal is received by a fixed site receiver of fixed transmitter/receiver 519 which is part of the fixed site equipment 110. The fixed transmitter/receiver 519 may be any fixed radio equipment suitable for use with cellular telephone systems and is further described in service manual 68P81060E30-0 available from Motorola, Inc. The data signal is demodulated from the radio carrier by the receiver and coupled to a signalling interface circuit 521 which is part of the site controller 522 and which recovers 10 KBS binary data and a 10 KHz clock for presentation to the fixed site DCSC 523 via lines 525 and 527 respectively. A VCP 528 (Voice Control Processor such as that described in the Fixed Network Equipment service manual no. 68P81052E50 and available from Motorola, Inc.) performs the functions of controlling the receive and transmit baseband audio, receiving SAT, and relaying SAT and other system control messages to higher level system processors (not shown). The DCSC 523 is similar to DCSC 503 and will be described later. The 9.6 KBS recovered data and its clock is presented to a conventional modem 529 via lines 531 and 533, respectively, for transmission down conventional wire line facilities to the cellular telephone exchange. Digital speech/data from the cellular telephone exchange is input to modem 529 for conversion to 9.6 KBS data and clock and coupled to DCSC 523 via lines 535 and 537 respectively. The modem 529 also produces a 10 KBS clock synchronous with the 9.6 KBS clock for presentation to DCSC 523 via line 538 and subsequent coupling to Manchester encoder 539 (which may be an implementation identical to Manchester encoder 511) via lines 541 and 543 respectively. The Manchester encoded signal is coupled to the fixed transmitter/receiver 519 for transmission to the subscriber unit 116.

The subscriber unit 116 receives the transmitted signal and demodulates it in the receiver of transmitter/receiver 517 and couples the demodulated Manchester encoded 10 KBS signal to signalling interface circuit 545. The signalling interface circuit 545 recovers the 10 KBS binary data and clock and presents them to DCSC 503 via lines 547 and 549. The transmitter receiver 517 also provides a two bit digital representation of the digital message equivalent to the supervisory tone employed in conventional cellular telephone systems on line 551. The DCSC 503 provides a detect logic level to transmitter/receiver 517 on line 553 to indicate presence of the proper digital SAT signal. The DCSC 503 couples 9.6 KBS data and clock to the speech/data converter 501 on lines 557 and 559 respectively. Speech/data converter 501 regenerates the original analog or data signal input from the cellular telephone exchange.

Figure 7:
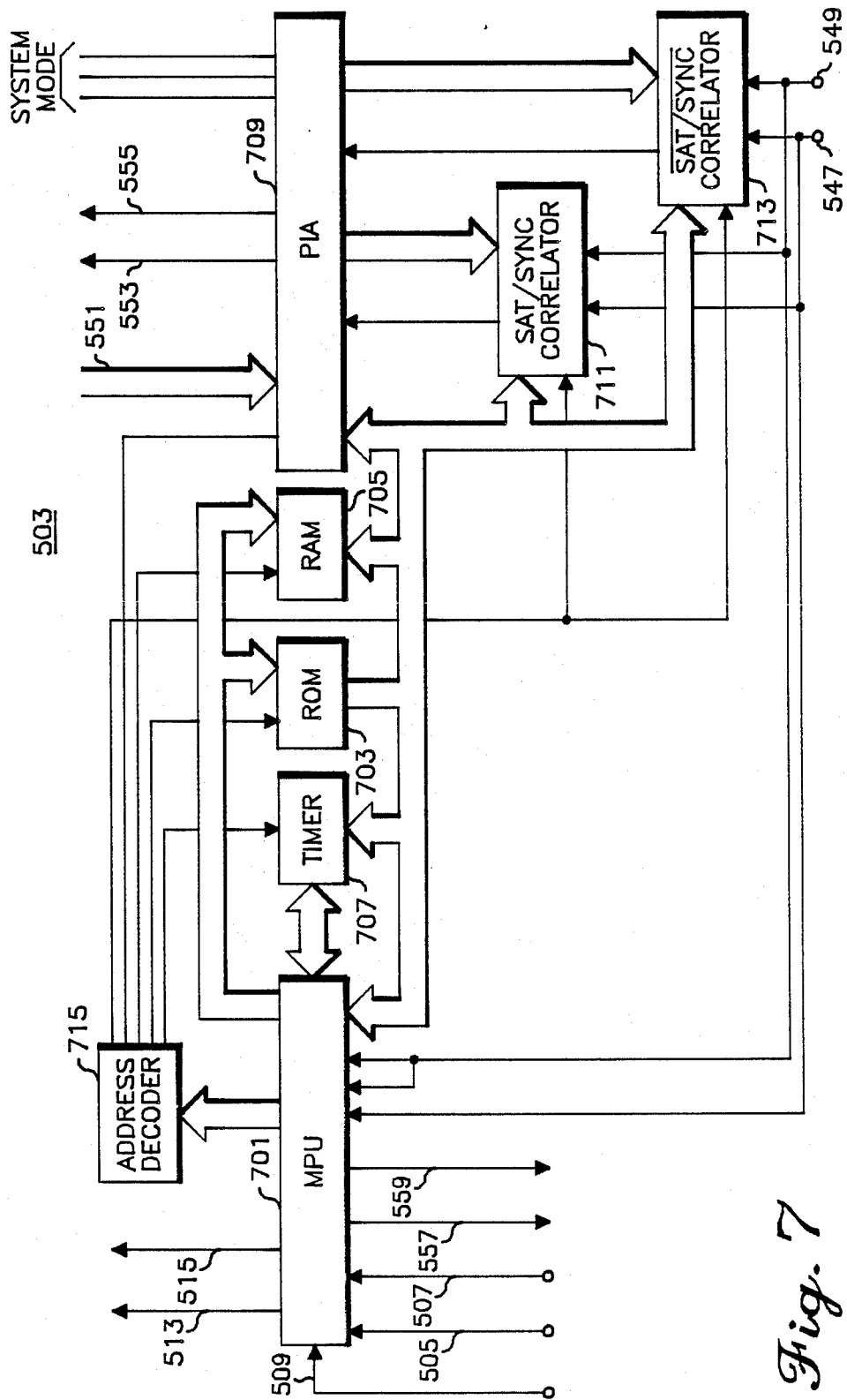
FIG. 7 is a block diagram of a digital cellular signalling control (DCSC) circuit which may be employed in the present invention.

The digital cellular signalling control (DCSC) function 503 is shown in detail in FIG. 7. The block diagram for DCSC 523 is similar except that an additional output of digital signalling tone detect is output to the VCP 528 on line 561. SAT detect is coupled to VCP 528 via line 563. The digital cellular signalling control (DCSC) is a microprocessor based data conversion and interpretation unit which employs a microprocessor 701 (which in an preferred embodiment may be an MC 6809 marketed by Motorola, Inc.) and associated memory. The memory is realized by conventional read-only memory (ROM) 703 and random access memory (RAM) 705. A timer 707 times the position and duration of SAT/SYNC words. A peripheral interface adapter (PIA) 709 provides an interface function between the microprocessor 701 and the other devices on the bus and performs the functions of bus buffer and latch. SAT/SYNC correlator 711 and $\overline{\text{SAT}}/\overline{\text{SYNC}}$ correlator 713 are conventional bit correlators and are described in conjunction with FIG. 25. Address lines A-13 through A-15 are coupled from microprocessor 701 to address decoder 715 and are used as chip select lines for $\overline{SAT}$/$\overline{SYNC}$ correlators 711 and 713, timer 707, ROM 703, RAM 705, and PIA 709.

Figure 8:
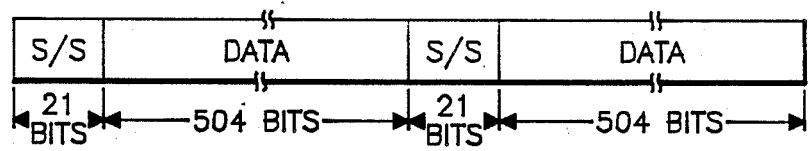
FIG. 8 is a timing diagram of the generalized synchronization format employed in the present invention.

The unique format for transmitting digitized speech, terminal data, and special control messages over a cellular voice channel employed by the present invention is shown in FIG. 8. With a 10 KBS channel bit rate, this format effectively provides a high speed 9.6 KBS data rate over a conventional cellular radio telephone system channel bandwidth.

The SAT/SYNC (S/S) word is a 21 bit correlator word which uniquely provides combined radio frequency (RF) frame synchronization, digital SAT (supervisory tone) information, and system mode information. A set of six 21 bit correlator words have been developed for the SAT/SYNC function in the preferred embodiment. This set consists of three correlator words $(S,S)_1$, $(S/S)_2$ and $(S/S)_3$ plus their ones complement inverses $(\overline{S/S})_1$, $(\overline{S/S})_2$, and $(\overline{S/S})_3$. This set may be designed to provide high auto/correlation properties (i.e. a 21 bit match when the word is aligned in the correlator and less than or equal to 2 bit match minus miss when the word is not aligned) and low cross correlation properties within the set by those skilled in the art. In the preferred embodiment, the three S/S 21 bit words and their inverses having high autocorrelation and low cross correlation properties which are employed are:

| SAT/SYNC | INVERSE SAT/SYNC |
| --- | --- |
| 011111010010110001000 | 100000101101001110111 |
| 000000111001101101010 | 111111000110010010101 |
| 010101011001100001111 | 101010100110011110000. |

The method by which these auto correlator words are used to provide SAT information, speech and data RF frame synchronization, and system information is as follows:

Each of the three 21 bit S/S correlator words and its inverse corresponds to one of the three SAT frequencies in general use by cellular radiotelephone systems (5970, 6000, and 6030 Hz). During a cellular call, one S/S and/or its inverse is used to convey supervisory information from the fixed site to the subscriber unit. The subscriber unit must then detect the S/S or its inverse and transpond it to the fixed site. The 21 bit correlators (711 and 713 of FIG. 7) at the subscriber unit and at the fixed site controller are programmed to detect one of three SAT words and its inverse. Due to the low cross correlation between words, the probability of one SAT falsing another is very small.

The low noise and cross SAT falsing probabilities are made possible by using all 21 bits for both correlation and for synchronization, rather than splitting the overhead bits for separate signalling tasks.

SAT information is conveyed between the fixed site and the subscriber unit by transmitting either S/S or its inverse $\overline{S/S}$. This allows system mode information to be continuously transmitted between the subscriber unit and the fixed site by encoding the sequence of transmitted S/S and its inverted words. System mode changes are communicated between the subscriber unit and the fixed site with automatic confirmation of the mode made via the transponded SAT signalling. SAT signalling is never interrupted during mode changes by utilizing the full 21 bit S/S correlator word for system mode definition. Since 21 bits are used in each S/S word detection, a high degree of protection is provided against incorrect mode changes. Additionally, this method also allows a double frame format for transmitting data terminal messages which will be described later.

Figure 9:
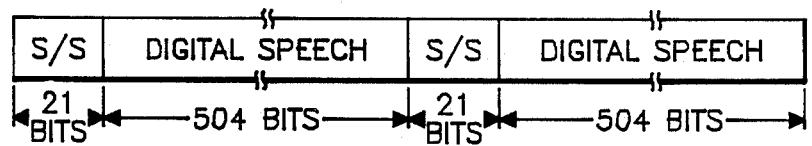
FIG. 9 is a timing diagram of the synchronization and digitized speech mode format employed in the present invention.

The format for transmitting digitized speech at 9.6 KBS is shown in FIG. 9. This is a more specific format than that shown in FIG. 8 in that the 504 bits of data comprise digitized speech. the ratio of 504 bits of digitized speech to 21 bits of overhead (SAT/SYNC) information provides an effective speech throughput of 9.6 KBS. SAT is continuously sent by transmitting the proper correlator word, S/S, which corresponds to the correct SAT frequency.

Figure 10:
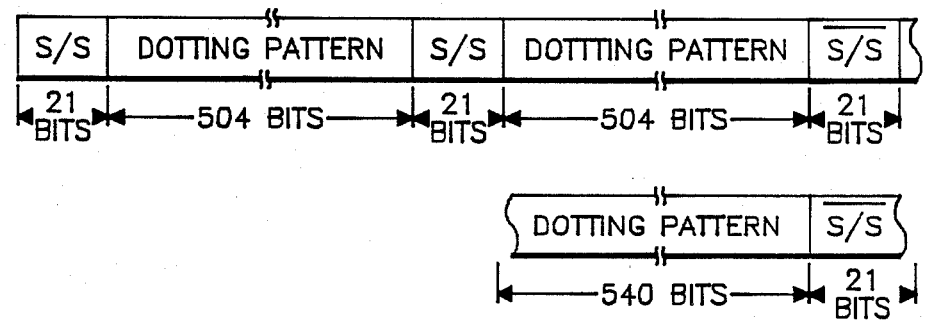
FIG. 10 is a timing diagram of the data halt transmission beginning the digitized speech mode employed in the present invention.
Figure 26:
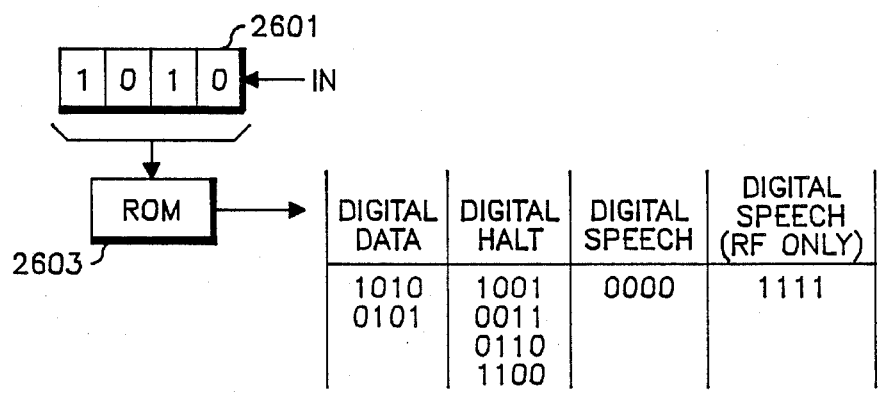
FIG. 26 is a block diagram and output table of the S/S pattern detector employed in the present invention.
Figure 27:
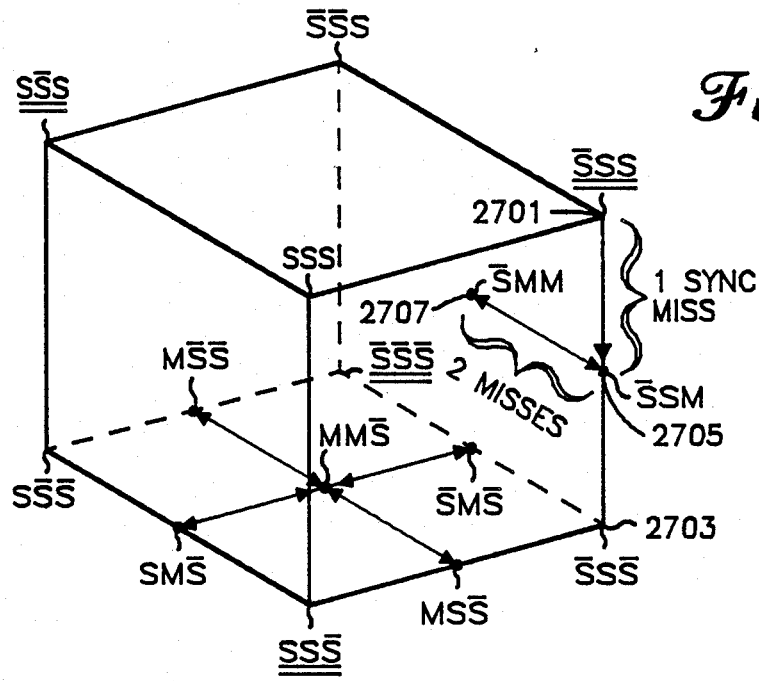
Figure 28:
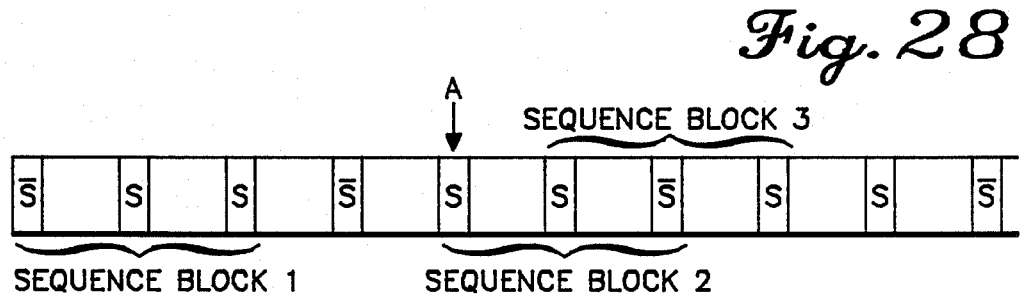
Figure 30:
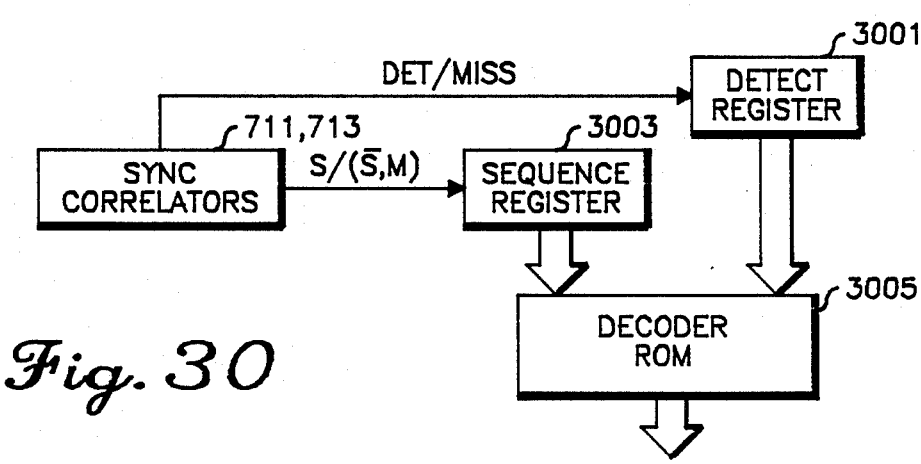
Figure 29:
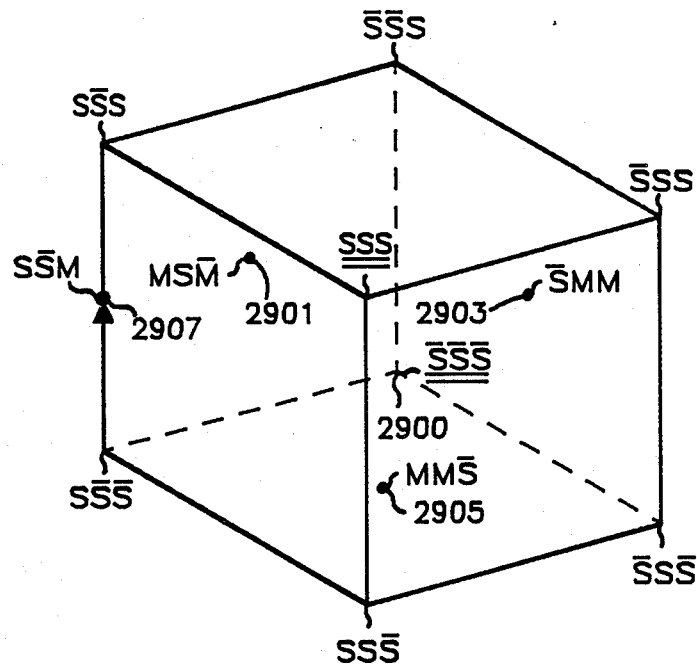
Figure 31:
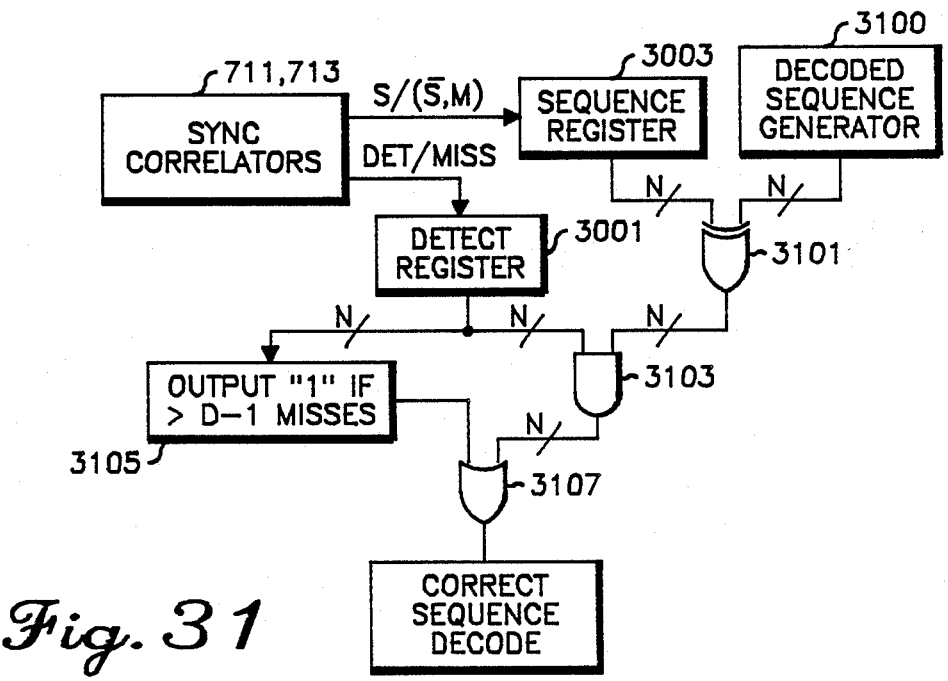
Figure 32:
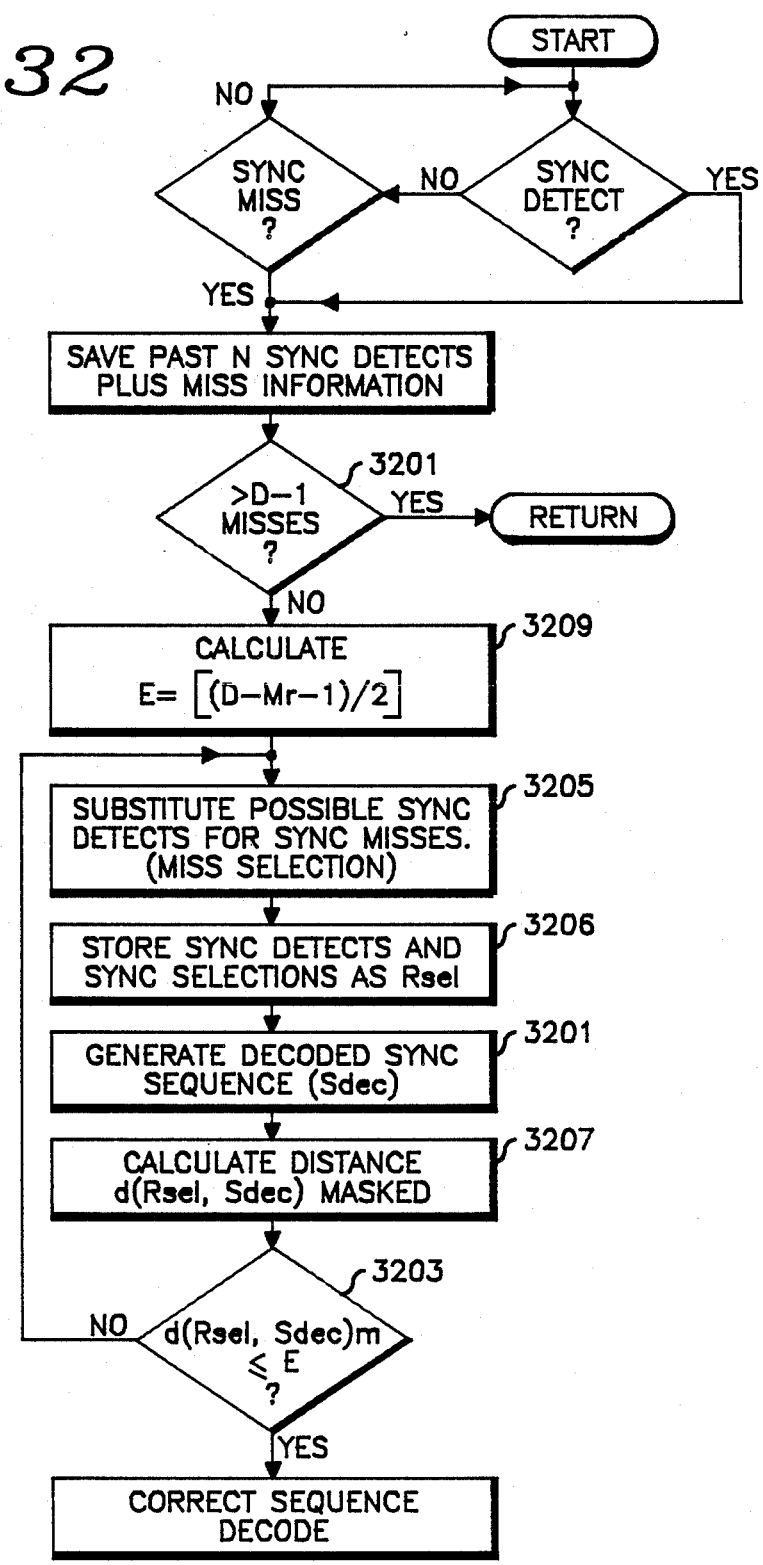
Figure 33:
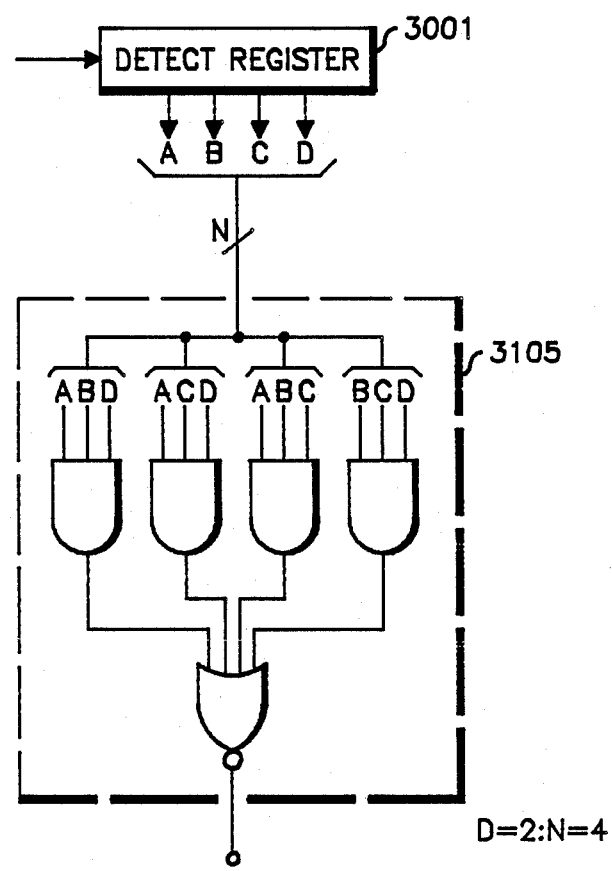

In the preferred embodiment, digitized speech mode is defined by transmitting only non-inverted S/S words for RF frame sync and SAT information. Four S/S words define the system mode, i.e. 0000 as shown in FIG. 26. In operation, a cellular radiotelephone call may be originated in the clear (non-digital) mode where the conventional analog SAT is sent and transponded. When the radiotelephone user wishes to switch to the digital speech mode, as he might if he were using a digital voice privacy device sometimes colloquially known as a scrambler, a reverse voice channel message is sent to the fixed site requesting a digital channel for private speech mode. After the fixed site receives the digital request message, it engages the digital site controller 522 of FIG. 5 and transmits the digital SAT format shown in FIG. 10 on the assigned radio channel. The 504 bits of "dotting" information (which may be the bit pattern 001100110011 . . . ) is used for bit synchronization. This subscriber unit then transponds the digital SAT signalling format to the fixed site, confirming that the subscriber unit is in the correct mode and is on the correct digital channel. Once in the digital mode, all further mode changes and confirmations are made by changing the S/S and the $\overline{S/S}$ sequences.

If a digital channel to be assigned to this subscriber unit is not the same as the channel currently used by this subscriber unit, a handoff command is transmitted from the fixed site to the subscriber unit to switch to a channel capable of digital service. The subscriber unit repeats the digital service request message until it receives the correct digital SAT and speech mode format.

To set up a digital privacy call (for example to transport public key information), the 504 bit dotting pattern may be replaced with encryption set-up data. After the digital privacy call is set-up, the 504 bit frame is used to transmit the digitally encoded speech at an effective rate of 9.6 KBS. The digitized speech data is subsequently used to derive bit synchronization between the S/S correlator words. If a predetermined number of consecutive S/S sequences are lost, speech is muted. When digital voice privacy is employed, continous bit synchronization from the subscriber unit through the fixed site to a landline encryption device allows proper operation of the encryption key generator without requiring periodic key generator data transfer. In the preferred embodiment, the bit synchronization withstands RF phase jumps, channel fading, drift between RF and landline modem clocks, and bit slippage due to an out-of-lock phase locked loop at the subscriber unit or the fixed site.

Figure 11:
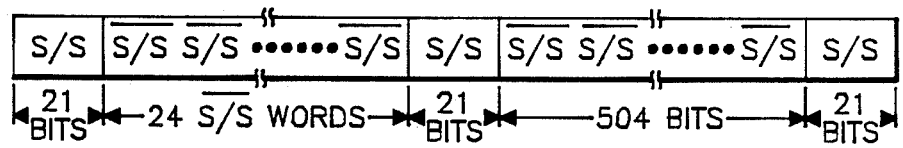
FIG. 11 is a timing digram of the data format for digital signalling tone (DST) employed in the present invention.

Digital signalling tone information can be transmitted coherently with SAT, using the format shown in FIG. 11. Twenty-four inverted (S̄/S̄) words of the same "SAT frequency" are inserted in the 504 bit frames. The 21 bit S/S words continue to be used to define SAT information, system mode, and frame timing. In the preferred embodiment, the fixed site may have a flexible algorithm to detect a majority number of the 24 inverted (S̄/S̄) words transmitted every frame of 525 bits. This method provides a very high signalling tone detect probability, while keeping the falsing probability low.

Figure 12:
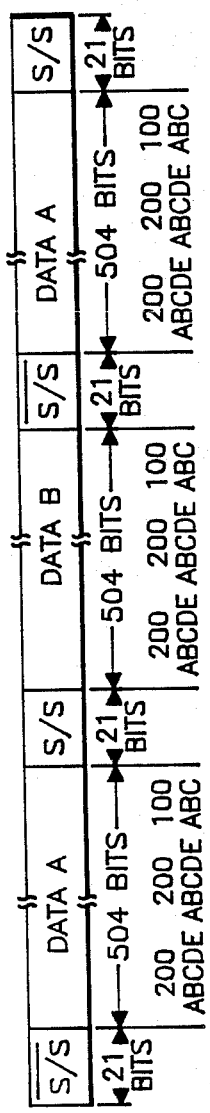
FIG. 12 is a timing diagram of the data format for 1200 bits per second data transfer employed in the data terminal mode of the present invention.

Transmission of data at a rate of 1200 BPS compatable with data terminals is shown in FIG. 12. Alternate S/S and S̄/S̄ synchronization words indicate that the system is in the data terminal mode. SAT information is conveyed, as described previously, by the selection of which S/S ad S̄/S̄ are transmitted. Inverted synchronization words, S̄/S̄, may also be used to define double length frames, 1050 bits, which permit the utilization of forward control channel error correction. In the preferred embodiment, this error correction uses 5 word interleaving (A, B, C, D, E) for improved burst error protection at lower vehicle speeds.

FIG. 12 illustrates that two 504 bit frames may be defined by alternating S/S and S̄/S̄ words. If frame synchronization is lost, this format allows quick double frame synchronization recovery. 500 bits from each frame are concatenated to form a 1,000 bit frame. This frame allows five repeats of 200 bit segments; each segment forming five different 40 bit words (A, B, C, D, E). At the receiver, the five 200 bit segment repeats are majority voted. The resulting five words of 40 bit each are then forward error corrected using (40, 28) BCH error correction. This technique results in 140 bits of corrected data every two frames (105 milliseconds). Thus, an effective data throughput of 1333.3 BPS, more than the required 1200 BPS rate, is provided. The added throughput can be used for modem control information, such as block parity and number of characters per block. Alternative error correction techniques can use the 1008 bit double frame data block to provide a higher effective data rate. A 2.4 KBS throughput requires 252 bits of data per double frame, which results in exactly a ¼th rate error correction.

Automatic digital data mode capability is provided by detecting an alternating sequence of S/S and S̄/S̄ words. Due to the low cross correlation property between an S/S correlator words and its inverse (as chosen in the set of six correlator words), plus utilization of the entire 21 bit S/S word, a high degree of cross falsing protection is provided in system mode determination.

Figure 13:
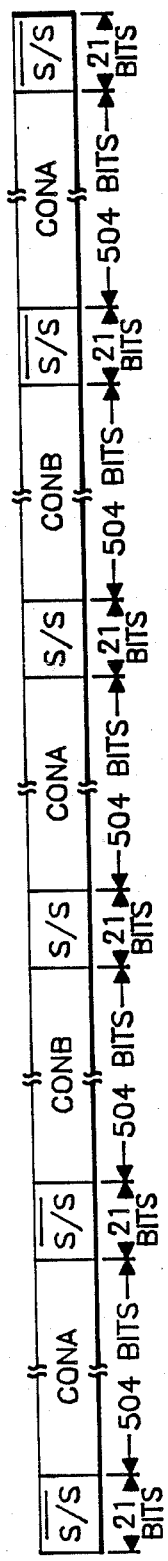
FIG. 13 is a timing diagram of the data halt format employed in the present invention.

After the conversation begins, all cellular radiotelephone system control messages (such as handoff or power change) are transmitted over the voice channels. While digitized speech can generally tolerate a message overriding the speech, data terminal transmission must be halted. FIG. 13 shows the preferred format which implements the data halt mode. As the figure indicates, the SAT/SYNC word (S/S) is inverted every second word. This mode can be invoked by either the fixed site or the subscriber unit. While in the data halt mode, special control messages (CONA, CONB) can be transmitted between the fixed site and the subscriber unit. For example, parity and data rate messages can be sent from the subscriber unit to the fixed site modem before the data transmission mode is initiated or after a handoff to set up the new fixed site modem.

Figure 14:
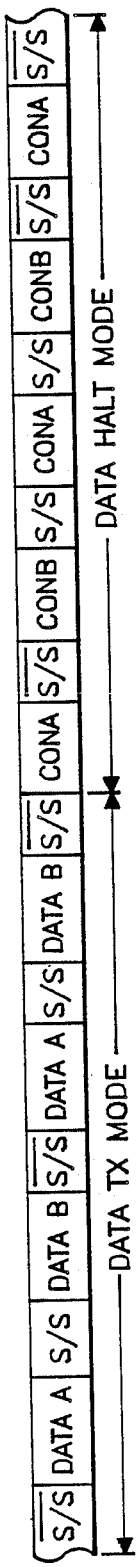
FIG. 14 is a timing diagram of the change between data terminal mode and data halt mode of the present invention.

Utilization of the data halt format as shown in FIG. 13 also provides a double frame synchronization for utilizing the same error control used during the transmission of 1200 baud data in the data terminal mode. CONA and CONB form a concatenated 1000 bit data frame, synchronized by the S/S words as shown in FIG. 13. When changing from data terminal transmit mode to data halt mode, the S/S sequence as shown in FIG. 14 is used. This sequence changes modes without losing double frame synchronization continuity or SAT information. This data format may be used to send special messages (CONA, CONB as shown) or may temporarily continue to send data terminal information.

For example, to transmit a handoff command during the data terminal mode, the fixed site will switch to the data halt mode shown in FIG. 13 prior to sending the handoff control message. Data terminal information continues to be transmitted within the data halt mode format using the double frame synchronization. The subscriber unit detects the data halt mode, stops mobile to landline data transmission, and sends a message to the landline terminal to halt data transmission. Once the subscriber unit determines that landline to mobile data transmission has been halted, and the subscriber unit transponds the new halt mode with its SAT information to the fixed site. The fixed site may then detects that data is halted in both direction and a handoff can proceed. After the handoff, the destination fixed site initially transmits SAT in the data halt system mode. The subscriber unit can send special messages to the fixed site in this mode to set-up a modem in the new cell. After the modem has been set-up, the fixed site may return to the transmit data terminal mode, Digital SAT transmission is never interrupted during these system mode changes.

Figure 15:
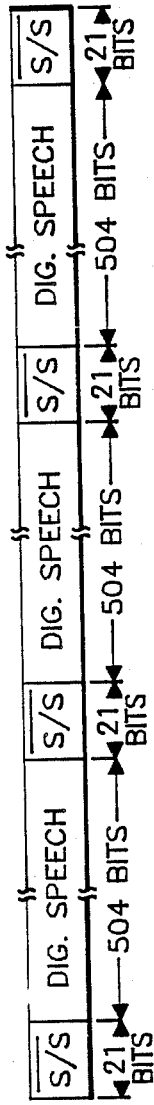
FIG. 15 is a timing diagram of the digitized speech (RF only) mode employed in the present invention.

A special digital speech mode can be used to provide speech privacy between the subscriber unit and the fixed site while providing clear speech to the cellular telephone exchange and the switch telephone network. The path most susceptible to interception, then, is protected without requiring the land end user to use a scrambling device. The signalling for this mode is shown in FIG. 15. Additionally, digital signalling tone information can be transmitted coherently with SAT during this mode using a format similar to that shown previously in FIG. 11 except that the SAT/SYNC words are inverse.

Figure 16:
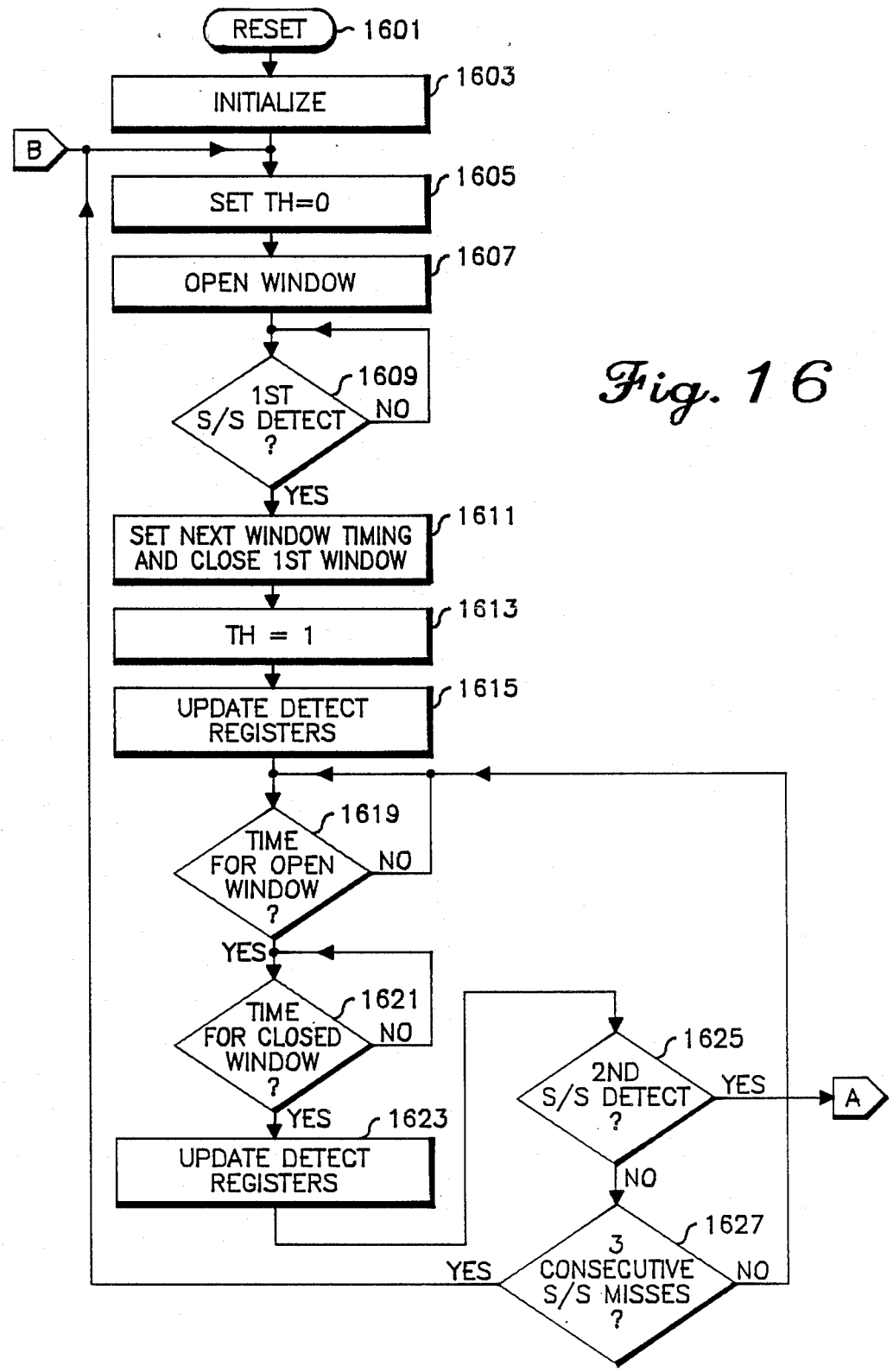
FIG. 16 is a flowchart of the DCSC synchronization (S/S) word soft detect subroutine.
Figure 17:
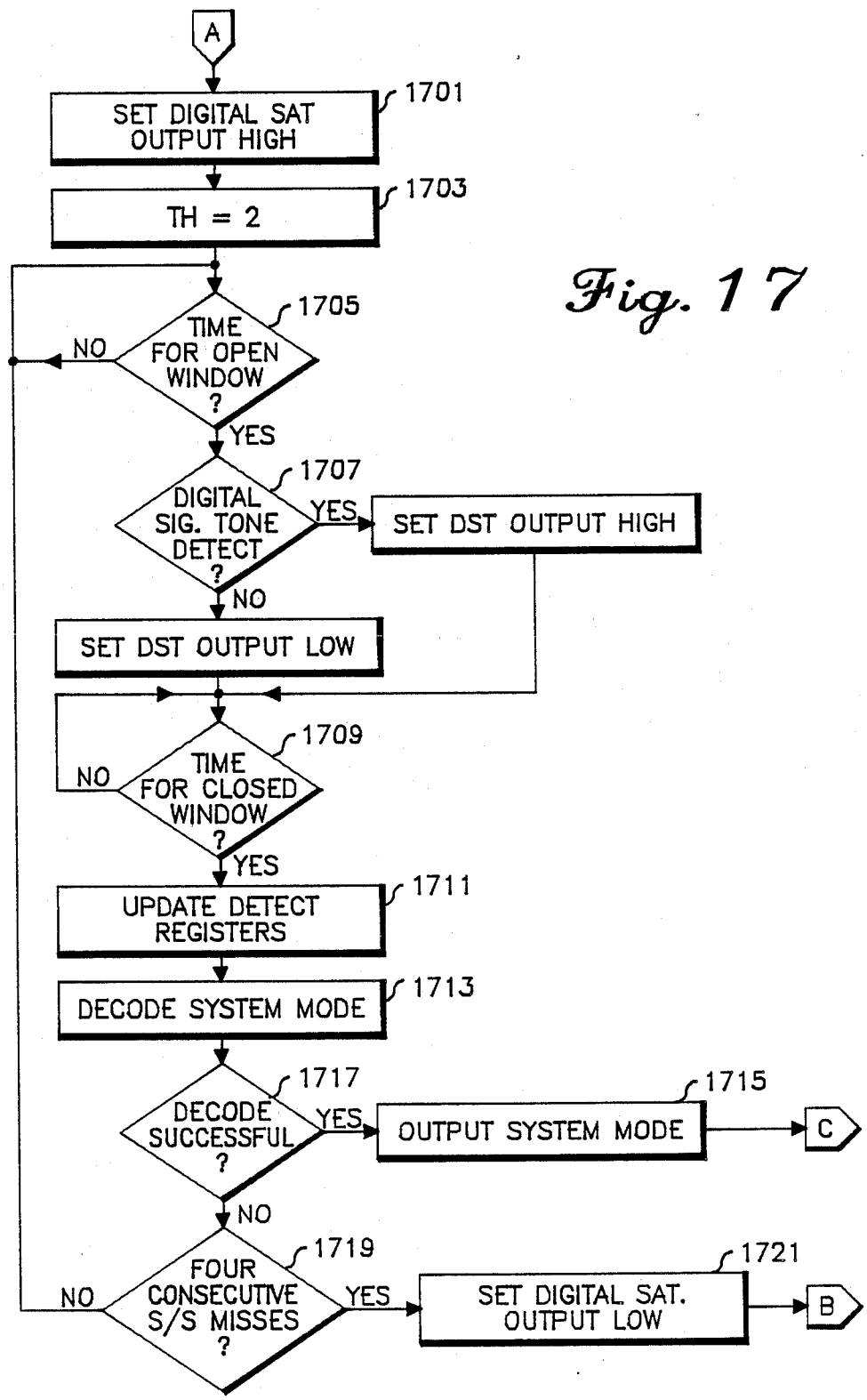
FIG. 17 is a flowchart of the DCSC S/S word mode detect subroutine.
Figure 18:
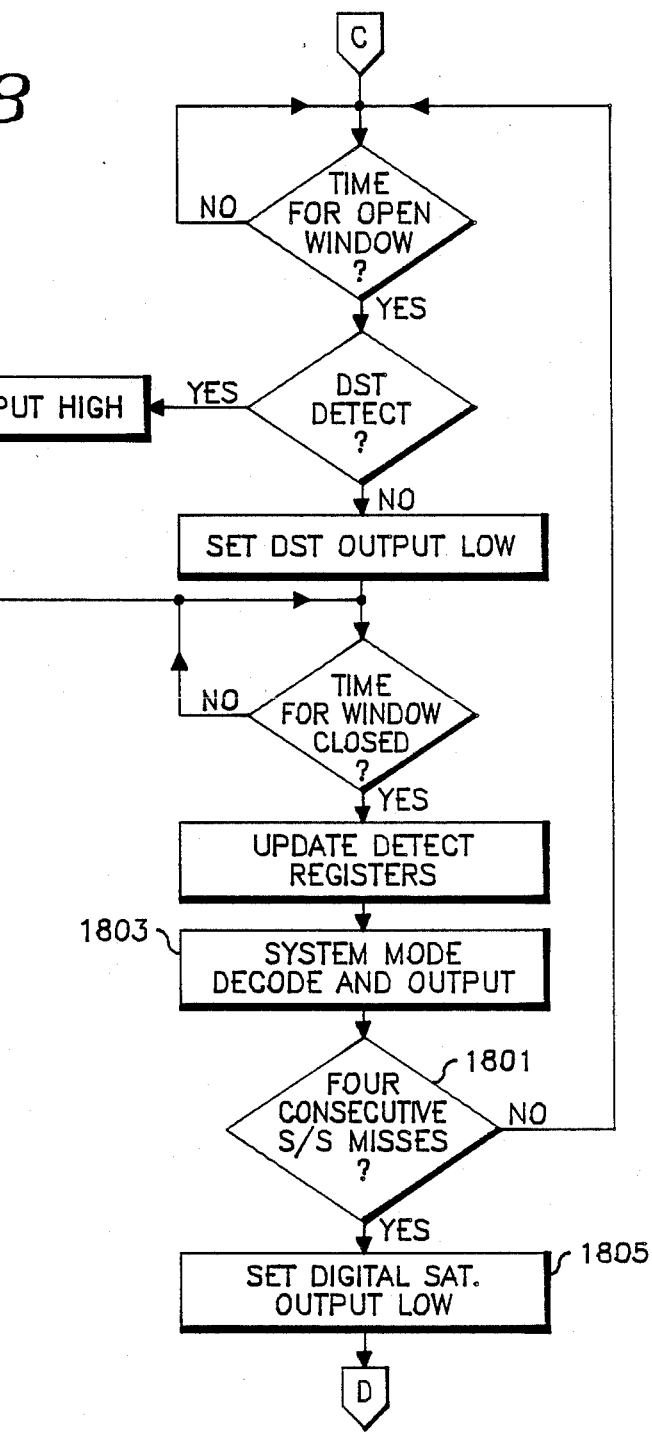
FIG. 18 is a flowchart of the DCSC S/S word synchronization maintenance subroutine.

The method of detecting SAT/SYNC signalling employed by the digital cellular signalling control (503 or 523 in FIG. 5) is illustrated in the flowcharts of FIGS. 16, 17 and 18. Referring first to FIG. 16, the DCSC is first reset at 1601 and the hardware is initialized at 1603 upon equipment power up. As has previously been described, the SAT/SYNC consists of 21 bit words transmitted at predetermined locations during data transmission. System mode information is contained in the transmission of particular sequences of the three S/S words and their inverses. Detection of the particular sequence is achieved by correlation of a received S/S word to a predetermined stored word or inverse and subsequent address determination from a binary representation of the S/S word sequence. Further description is given in conjunction with FIG. 26. The first series of steps in the signalling routine performs the function of a "soft" detection which in essence is the prevention of falsing. Essentially the received data is correlated with the expected one of the three S/S words and its inverse in a conventional fashion. The expected word is provided by the binary representation coupled to the DCSC on lines 551. A detection of a received S/S word must occur for the system to proceed. Following the first word detection, one more detection of an S/S word must occur at the proper time within the next three frames, allowing one bit error. This is accomplished as follows: a bit error threshold is set to zero allowable errors at 1605 following initialization 1603. A window of time, during which the received data is examined for correlation, is opened at 1607. During the time window the data is tested for data correlation. When an errorless correlation is detected at 1609 the timing of the next window for the next S/S word is set and the first window time is closed at 1611.

Following a first S/S word detection, the error threshold is set at one allowable bit error at 1613 and detect registers for the S/S word are updated at 1615. At a time determined by the "set next window" step 1611, a second timing window is opened at 1619 and closed a predetermined time later at 1621. An interrupt driven background subroutine, which will be described later, determines whether a correlation has occurred within the proper time window. The detect registers are subsequently updated at 1623 and a test for the second S/S word detect is made at 1625. If the second S/S word is detected, the program moves to the next portion of its operation at A. If a second S/S detect is not found at 1625, a determination of whether three consecutive S/S word detections have been missed during the proper window time at 1627. If three consecutive misses have not occurred, the program returns to the window timing sequence at 1619. If three consecutive misses have occurred, the program returns to the first word "soft" detect sequence starting at 1605.

Referring now to FIG. 17, as a result of the previously described steps, digital SAT has been detected and the digital SAT output of the DCSC is set high at 1701. The program then moves to the system mode detection sequence and starts by setting the bit error threshold to two at 1703. Window timing, which is established by previous S/S detects, is opened at 1705. During the time window, determination of the presence of digital signalling tone (DST) detection for the previous frame is made at step 1707 and the DST output is set high or low depending upon the detected presence or absence of digital signalling tone respectively. (DST presence is determined at this time window because DST is not present during the S/S word, therefore the determination does not interefere with DST detection operations). The window is closed at the proper time at step 1709 and the detect registers are updated at 1711. The system mode is determined at 1713 from the detect registers and a successful decode causes the system mode to be output from the DCSC at 1715. An unsuccessful system mode decoding at 1717 causes the subroutine to loop back to the synchronization window opening at 1705. Four consecutive S/S word misses at 1719 returns the process to the initial SAT detect subroutine at 1605 after setting the digital SAT output low at 1721.

Figure 19:
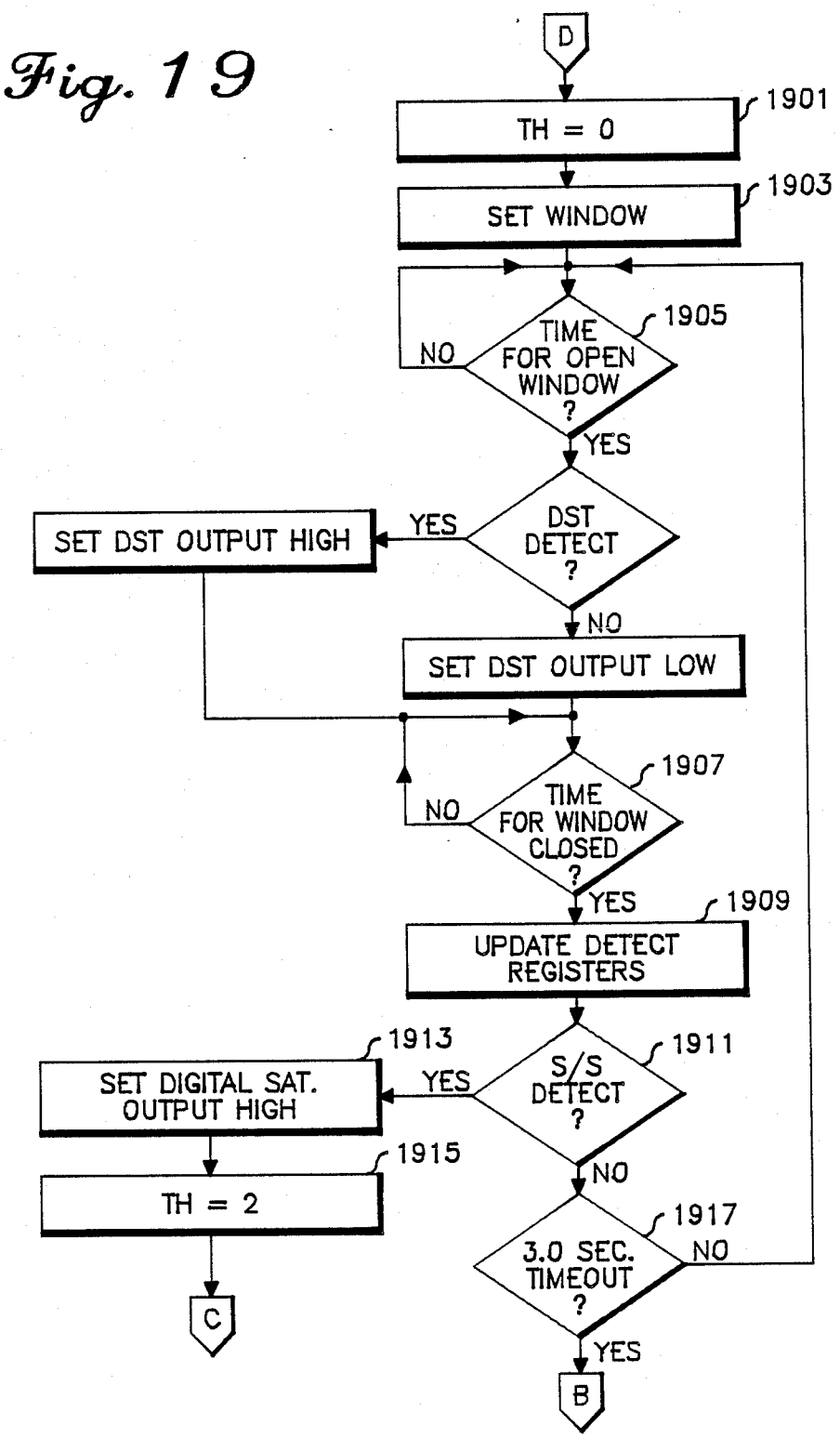
FIG. 19 is a flowchart of the DCSC S/S word reacquisition subroutine.

Referring now to FIG. 18, an ongoing detection of synchronization and system mode is accomplished by a continuing check of S/S word correlation (allowing for three consecutive S/S misses at 1801) and system mode decode at 1803. If four consecutive S/WS word misses occur, it is assumed that the received sychronization is lost and a reacquisition sequence is attempted as shown in FIG. 19 following the setting of the digital SAT output low at 1805.

Reacquisition is attempted by setting the bit error threshold to zero at 1901 and setting the S/S window to the expected time plus or minus a larger predetermined range than before, which in the preferred embodiment is plus or minus 600 microseconds, at 1903. The window is opened at the newly adjusted time at 1905 and closed at the adjusted time at 1907. The detector registers are updated at 1909 and a determination of a S/S word detect is made at 1911. If the S/S word is detected within the wider window, the digital SAT output is set high at 1913, the error threshold is set to 2 at 1915, and the program returns to the synchronization maintanence detection subroutine of FIG. 18. A lack of a S/S detect at 1911 causes the subroutine to return to the expanded window opening time step of 1905 unless a three second timer has timed out at 1971. If the three second timer has timed out the program returns to the SAT detect subroutine at 1605.

Figure 20:
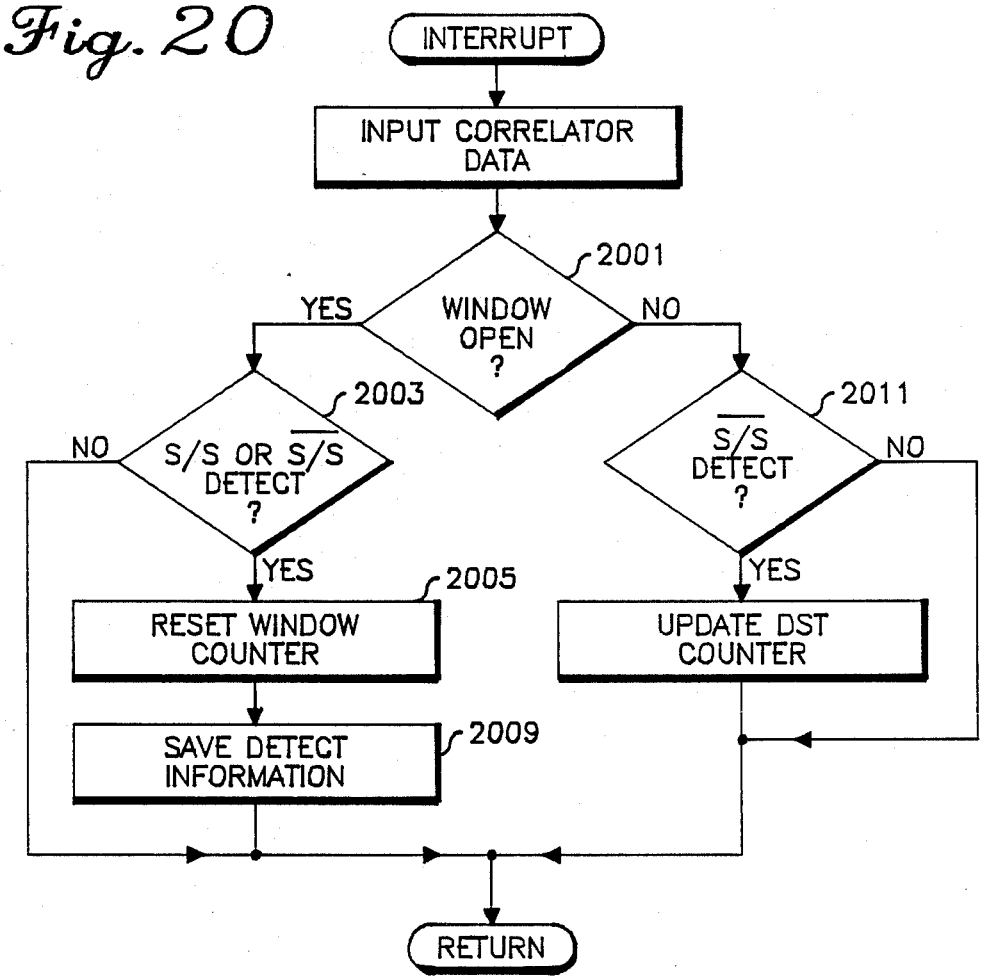
FIG. 20 is a flowchart of the DCSC S/S word detection background subroutine.

An interrupt driven background subroutine to handle S/S word detects it continuously running and is shown in FIG. 20. If the S/S detection window is open, as determined at 2001, a determination of whether a S/S or a $\overline{S/S}$ word detect has occurred at 2003 is made. A positive detect results in the window timer counter being reset around the last S/S word detect time at 2005 and the S/S word detect is saved at 2009. If the window is not opened as determined by step 2001, a determination of whether $\overline{S/S}$ detection is made at times other than the S/S window time at 2011. $\overline{S/S}$ detection at this time means that digital signalling tone (DST) is being transmitted and 5 $\overline{S/S}$ detections result in a DST detect determined during the previously described program.

Figure 21:
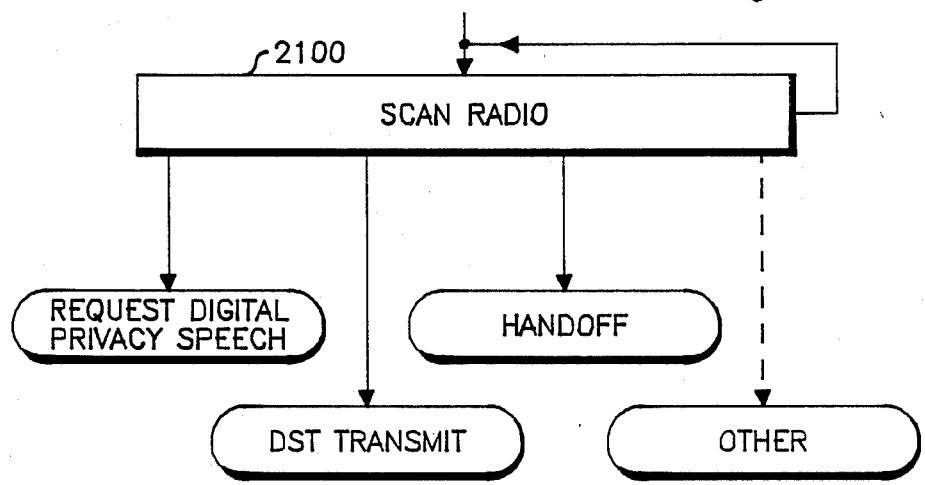
FIG. 21 is a flowchart of the subscriber unit DCSC radio scan background subroutine.

The subscriber unit maintains a second background subroutine which is shown in FIG. 21. The subscriber may input commands to the subscriber unit via a switch, a keyboard, or other method which results in the subscriber unit taking a certain action. Additionally, the radio system may impose requirements on the transceiver which are communicated via the radio channel and conventionally interpreted by the radio receiver logic system. The radio transceiver scans the inputs for possible commands at 2100 and determines whether the command is a user input or a requirement to determine the call (DST transmit); or whether a handoff is being commanded by the system. Other commands may be defined as necessary. (For clarity, the scan radio state, which may be caused to loop upon it self while waiting for an input, is shown in following flowcharts with only a single command output although any command output may be generated.

Figure 22:
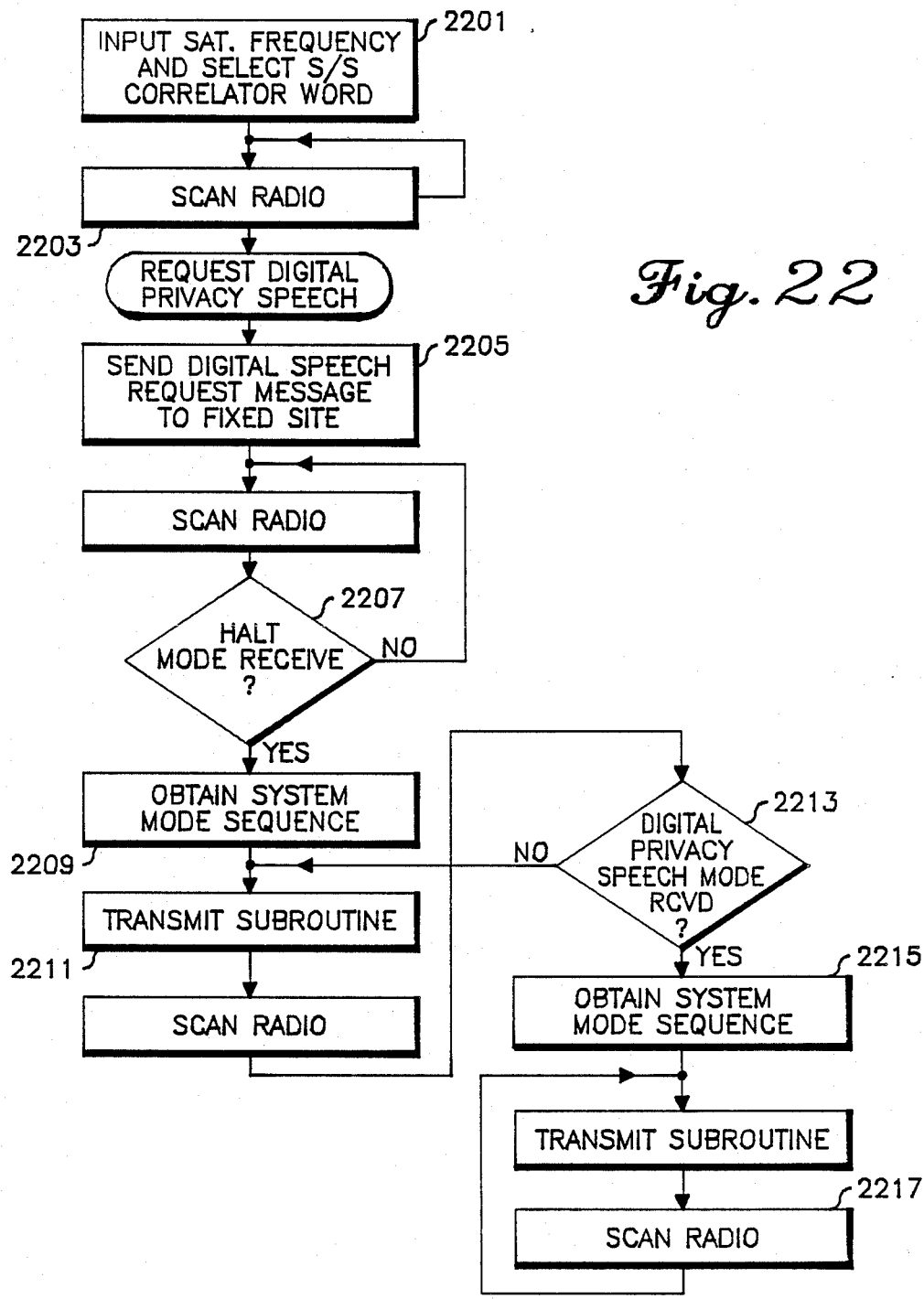
FIG. 22 is a flowchart of the DCSC S/S word transmission subroutine.

One commanded DCSC transmit process is shown in FIG. 22. The particular SAT frequency is specified by the two bit code input to the program by a hard coding at the fixed site or by the received and detected code at the subscriber unit. This two bit code is input at 2201 and a S/S correlator word corresponding to this SAT frequency is selected from memory. The subscriber unit transceiver radio interface with the subscriber is scanned for entry of additional commands at 2203. If a request for digital privacy speech is made and input by the subscriber, the subscriber unit transmits a digital privacy speech request in conventional flash fashion on the reverse voice channel to the fixed state at block 2205. The subscriber unit waits in the scan radio state until a halt mode signal (shown in FIG. 10) is received at 2207. Upon detection of the halt mode from the fixed site, the halt mold S/S sequence is recalled from memory (shown in FIG. 10) at 2209 and caused to be transmitted at 2211. The subscriber unit remains in the transmit subroutine 2211 loop, transmitting one frame on each pass through subroutine 2211 until the digital privacy mode data signal is transmitted by the fixed site and detected at 2213. When the digital privacy speech mode transmitted by the fixed site is detected at 2213, the subscriber unit recalls the digital privacy mode from memory, at 2215, and again enters a transmit subroutine-scan radio state loop. Each pass of the loop results in a transmission of a frame of digital privacy speech and a S/S word. When the subscriber elects to leave the digital privacy speech mode, his input is detected at scan radio 2217 and the request is transmitted to the fixed site via the halt mode pattern shown in FIG. 10. A sequence of events similar to those shown in FIG. 22 then occurs to remove the system from the digital privacy speech mode.

Figures 23, 24:
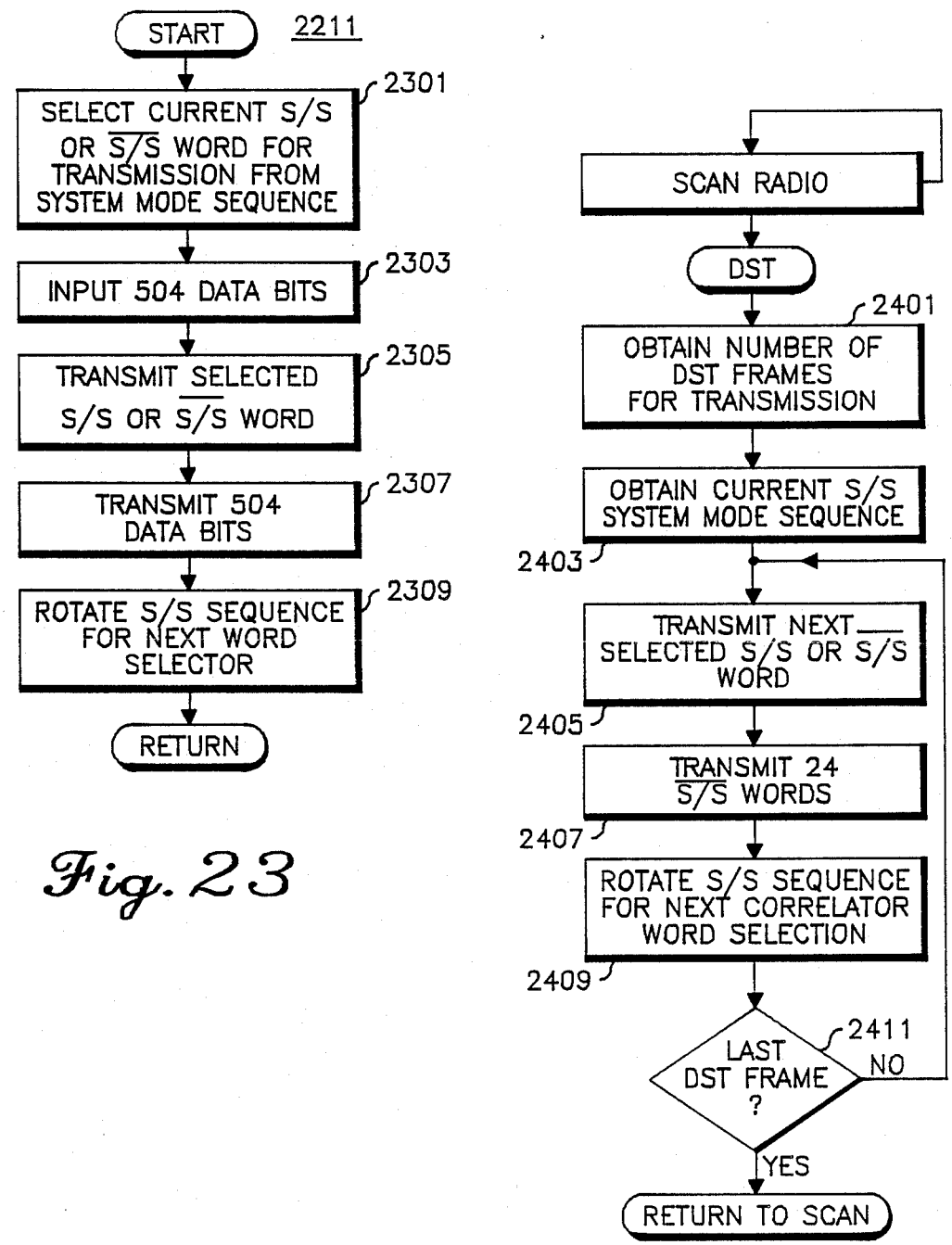
FIG. 23 is a flowchart of the transmit subroutine employed in FIG. 22.
FIG. 24 is a flow chart of the DCSC digital signalling tone (DST) transmission subroutine.

The transmit subroutine is shown in greater detail in FIG. 23. The selected first S/S word of the system mode sequence, determined at an earlier stage of the program, is input at 2301 and the first 504 data bits are input at 2303. The S/S word and the data bits are then transmitted sequentially at 2305 and 2307 respectively. Before returning to the main program, the selected system mode word sequence is rotated one word at 2309 so that the next S/S word is in the proper memory location for the next pass through the transmit subroutine.

If the scan radio state determines that a digital signalling tone (DST) must be transmitted, such as when the radiotelephone call is to be terminated, the subroutine of FIG. 24 is entered. The number of DST frames requires is obtained at 2401 and the current mode S/S sequence is recalled at 2403. The next S/S word sequence is recalled at 2403. The next S/S word in the sequence is transmitted at 2405 followed by 24 $\overline{S/S}$ words at 2407. The next S/S word in the sequence is rotated into place at 2409 before a test of the number of frames transmitted is made to 2411. If the last frame has been transmitted, the subroutine returns to the scan radio state.

Figure 25:
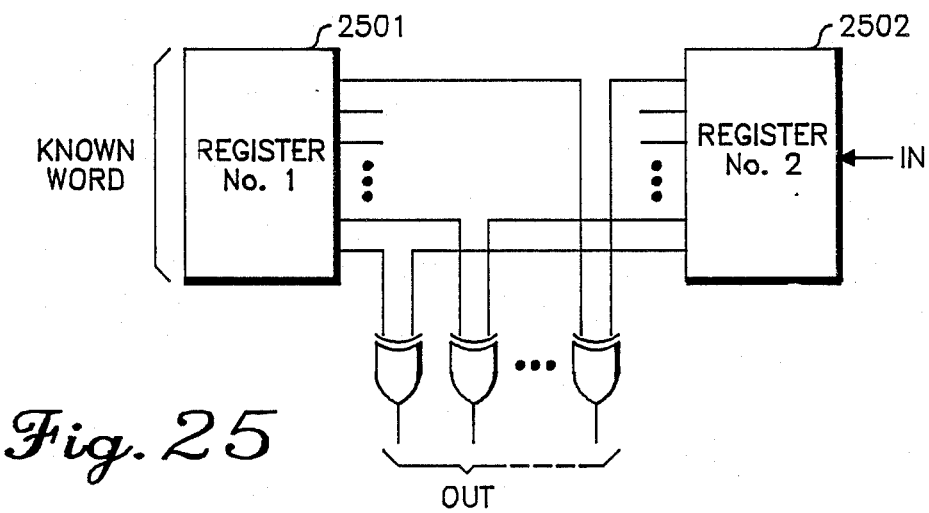
FIG. 25 is a block diagram of the synchronization word detection correlator employed in the present invention.

Detection of a S/S word, in the preferred embodiment, is accomplished with a conventional correlator such as that shown in FIG. 25. A known word (which may be a fixed 21 bit word in the fixed site or a 21 bit SAT/SYNC word identical to that decoded by the subscriber unit on the forward set up channel) is input to register 1 (2501). The received data is serially clocked into Register 2 (2502). The outputs of registers 1 and 2 are compared location to location by conventional exclusive OR functions whose outputs are checked for mismatch. If the number of mismatches is over a predetermined thershold, no detect is found.

Mode detection may be accomplished by inputting a binary logic level corresponding to a detected S/S word and the opposite binary level corresponding to a detected $\overline{S/S}$ word. The register 2601 in FIG. 26 may then contain a sequence of bits corresponding to the S/S or $\overline{S/S}$ words detected. These bits, in the preferred embodiment, form an address to a plurality of storage locations in ROM 2603. As the bits are clocked through register 2601, addresses such as those shown in the table of FIG. 26 are generated and are interpreted as the modes: digital data, digital halt, digital speech, or digital speech (RF only).

Thus, a signalling system for digital speech/data transmission via a cellular radiotelephone system has been shown and described. This system allows the transmission of 9.6 kilobit digital privacy speech and high speed data through a cellular system while providing a digitally encoded signal for maintaining cellular system control such as SAT, signalling tone and control messages for handoffs, power changes, and other system functions. The use of multiple correlator words for providing RF frame synchronization, SAT information, signalling tone, speech/data mode information, and clear/private mode information makes efficient use of channel overhead capability and receiver detection hardware and software. The system mode of operation is continuously communicated and verified between the subscriber unit and the fixed site without additional overhead bits for this purposes. Digital SAT transmission remains uninterrupted during system mode changes.

Therefore, while a particular embodiment of the invention has been described and shown, it should be understood that the invention is not limited thereto since modifications may be made by those skilled in the art. It is therefore contemplated to cover by the present application any and all such modifications that fall within the true spirit and scope of the basic underlying principles disclosed and claimed herein.

We claim:

1. A radiotelephone system carrying high speed digital messages between one of a plurality of fixed sites and one of a plurality of subscriber units comprising:
    means for generating one of a plurality of high autocorrelation, low cross correlation multiple bit data words and its logical inverse whereby one of the plurality of fixed sites may be identified;
    means for generating a pattern of one of a predetermined sequence of said generated multiple bit data word and said logical inverse whereby a system mode of operation may be specified by said generated pattern;
    means for interleaving said generated pattern with a predetermined number of bits of a digital message to create a message stream;
    means for transmitting said message stream from said one of the plurality of fixed sites;
    means for receiving said message stream at one of the subscriber units;
    means for detecting one of said multiple bit data word and said logical inverse from said received message stream to identify said one of a plurality of fixed sites and to synchronize said digital message; and
    means for detecting said generated pattern from said received data stream to determine a system mode of operation.

2. A radiotelephone system in accordance with claim 1 wherein said means for detecting one of said multiple bit data word and said logical inverse further comprises means for establishing a first time window in which either the next interleaved multiple bit word or its logical inverse is expected to occur.

3. A radiotelephone system in accordance with claim 2 wherein said means for detecting said generated pattern further comprises means for detecting said generaed pattern within said first time window and establishing a second time window.

4. A radiotelephone system in accordance with claim 1 wherein said means for detecting one of said multiple bit data word further comprises means for determining when a predetermined number of multiple bit data word detections are missed sequentially.

5. A radiotelephone system in accordance with claim 1 wherein said pattern of one of a predetermined sequence of said generated multiple bit data word and said logical inverse further comprises four words.

6. A radiotelephone system in accordance with claim 1 wherein said multiple bit data word further comprises 21 bits.

7. A method of system control in a cellular radiotelephone system carrying digital messages from a plurality of fixed sites to a plurality of subscriber units in which a predetermined number of data bits of the digital message are employed for system control, comprising the steps of:
  generating one of a plurality of high autocorrelation, low cross correlation multiple bit words and its logical inverse, whereby one of the plurality of fixed sites may be identified;
  generating a pattern of one of a predetermined sequence of said generated multiple bit data words and said logical inverse of said generated multiple bit words whereby a system mode of operation may be specified by said generated pattern;
  interleaving said generated pattern with a predetermined number of bits of a digital message to create a message stream;
  transmitting said message stream from said one of the plurality of fixed sites;
  receiving said message stream at one of the subscriber units;
  detecting one of said multiple bit data word and said logical inverse from said received message stream to identify said one of a plurality of fixed sites and to synchronize said digital message; and
  detecting said generated pattern from said received data stream to determine a system mode of operation.

8. A method of system control in accordance with claim 7 further comprising the step of establishing a first time window, in response to said detecting one of said multiple bit data word and said logical inverse step, in which either the next interleaved multiple bit data word or its logical inverse is expected to occur.

9. A method of system control in accordance with claim 8 wherein said detecting said generated pattern step further comprises the steps of detecting said generated pattern within said first time window and establishing a second time window.

10. A method of system control in accordance with claim 7 further comprising the step of determining, in response to said detecting one of said multiple bit data word step, when a predetermined number of multiple bit data word detections are sequentially missed.

11. A digital message transmitter in accordance with claim 1 wherein said multiple bit data word further comprises 21 bits.

12. A digital message transmitter for a cellular radiotelephone system having at least two modes of operation, said transmitter comprising:
  means for generating one of a plurality of high auto correlation, low cross correlation multiple bit data words and its logical inverse whereby the transmitter may be identified;
  means for generating a pattern of one of a predetermined sequence of said generated multiple bit data word and said logical inverse whereby a mode of operation may be specified;
  means for interleaving said generated pattern with a predetermined number of bits of the digital message; and
  means for modulating said interleaved pattern and message on a radio carrier.

13. A digital message transmitter in accordance with claim 12 wherein said pattern of multiple bit word and logical inverse further comprises four words.

14. A digital message transmitter in accordance with claim 12 wherein said predetermined number of bits of digital message further comprises 504 bits.

15. A method of transmitting synchronization, mode of operation, and identification in a cellular radiotelephone system carrying digital messages, comprising the steps of:
  generating one of a plurality of high auto correlation, low cross correlation multiple bit data words and its logical inverse;
  generating a pattern of one of a predetermined sequence of said generated multiple bit data word and said logical inverse;
  interleaving said generated pattern with a predetermined number of bits of a digital message; and
  modulating said interleaved pattern and message on a radio carrier.

16. A digital message receiver for a cellular radiotelephone system receiving a digital message interleaved with a predetermined pattern of correlation words, each correlation word consisting of a selected data bit word or the logical inverse of the selected data bit word, comprising:
  means for demodulating the interleaved digital message and predetermined pattern of correlation words from a radio carrier;
  first means for detecting a first one of the correlation words from the pattern of correlation words if said first one of the correlation words has fewer than a first predetermined number of correlation errors and for establishing a first time window in which a second one of the correlation words is expected to occur;
  second means, responsive to said first means detection of a first one of the correlation words, for detecting said second one of the correlation words from the pattern of correlation words if said second one of the correlation words has fewer than a second predetermined number of correlation errors; and
  means responsive to said second means detection of a second one of the correlation words, for decoding the predetermined pattern of correlation words.

17. A digital message receiver in accordance with claim 16 wherein said first predetermined number of bit errors equal one bit error and said second predetermined number of bit errors equals three bit errors.

18. A digital message receiver in accordance with claim 16 wherein said predetermined number of sequential missed detections equals four.

19. A method for receiving a digital message interleaved with a predetermined pattern of correlation words, each correlation word consisting of a selected data bit word or the logical inverse of the selected data bit word in a radiotelephone system, comprising the steps of:
  demodulating the interleaved digital message and predetermined pattern of correlation words from a radio carrier;

detecting a first one of the correlation words from the pattern of correlation words if said first one of the correlation words has fewer than a first predetermined number of correlation errors and establishing a first time window in which a second one of the correlation words is expected to occur;

detecting said second one of the correlation words from the pattern of correlation words, in response to said first one of the correlation words detection, if said second one of the correlation words has fewer than a second predetermined number of correlation errors; and decoding the predetermined pattern of correlation words in response to said second one of the correlation words detection.

* * * * *